(12) United States Patent
Roger et al.

(10) Patent No.: US 6,796,742 B1
(45) Date of Patent: Sep. 28, 2004

(54) APPARATUS FOR THE CONNECTION AND LAYING OF THE SUCCESSIVE PARTS OF AN OFFSHORE SUPPLY LINE FROM A VESSEL AND APPLICATIONS THEREOF

(75) Inventors: Pierre Roger, Bois-Colombes (FR); François-Xavier Rol, Luce (FR); Christian Rueda, Vincennes (FR); Michel Baylot, Marseilles (FR)

(73) Assignee: Bouygues Offshore, Montigny-le-Bretonneux (FR)

( * ) Notice: Subject to any disclaimer, the term of this patent is extended or adjusted under 35 U.S.C. 154(b) by 0 days.

(21) Appl. No.: 09/926,420

(22) PCT Filed: Apr. 28, 2000

(86) PCT No.: PCT/FR00/01155

§ 371 (c)(1),
(2), (4) Date: Jan. 29, 2002

(87) PCT Pub. No.: WO00/66923

PCT Pub. Date: Nov. 9, 2000

(30) Foreign Application Priority Data

Apr. 30, 1999 (FR) .............................................. 99 05534
Sep. 16, 1999 (FR) .............................................. 99 11584

(51) Int. Cl.⁷ ................................................. F16L 1/12
(52) U.S. Cl. ................................... 405/166; 405/168.3
(58) Field of Search ............................... 405/158, 166, 405/167, 168.1, 168.2, 168.3, 168.4; 114/268

(56) References Cited

U.S. PATENT DOCUMENTS

| | | | |
|---|---|---|---|
| 3,680,322 A | | 8/1972 | Nolan, Jr. et al. ............ 61/72.3 |
| 3,860,122 A | | 1/1975 | Cernosek ..................... 214/1 P |
| 4,068,490 A | * | 1/1978 | Jegousse ...................... 405/166 |
| 5,421,675 A | | 6/1995 | Brown et al. ................ 405/170 |
| 5,464,307 A | * | 11/1995 | Wilkins ....................... 405/166 |
| 5,533,834 A | * | 7/1996 | Recalde ................... 405/168.3 |
| 5,823,712 A | | 10/1998 | Kalkman et al. ............ 405/165 |
| 6,364,573 B1 | * | 4/2002 | Baugh ......................... 405/166 |

FOREIGN PATENT DOCUMENTS

| | | |
|---|---|---|
| EP | 0 262 545 | 4/1988 |
| EP | 0 661 488 | 7/1995 |
| GB | 2 095 787 | 10/1982 |
| GB | 2 310 267 | 8/1997 |
| WO | 91/15699 | 10/1991 |
| WO | 98/50719 | 11/1998 |

* cited by examiner

Primary Examiner—Michael Safavi
(74) Attorney, Agent, or Firm—Jacobson Holman PLLC

(57) ABSTRACT

A device for laying submarine pipeline from a vessel at sea. The device has a support or laying tower that can be inclined in a variable manner. The device has a workstation for assembling the successive parts of an offshore pipeline with the workstation attached to the vessel independently of the tower and is displaceable along the vessel to assemble the successive parts of the pipeline.

33 Claims, 23 Drawing Sheets

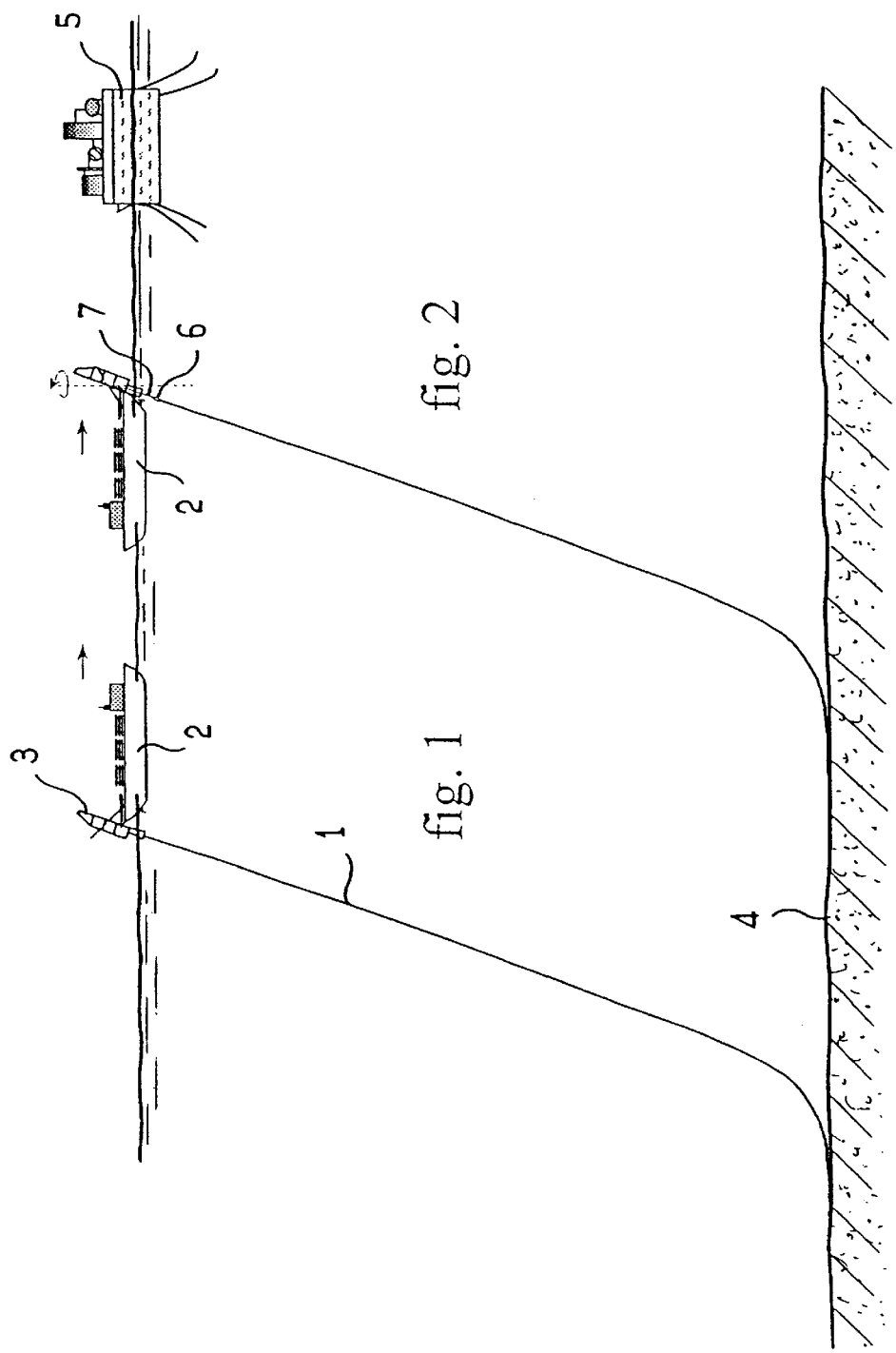

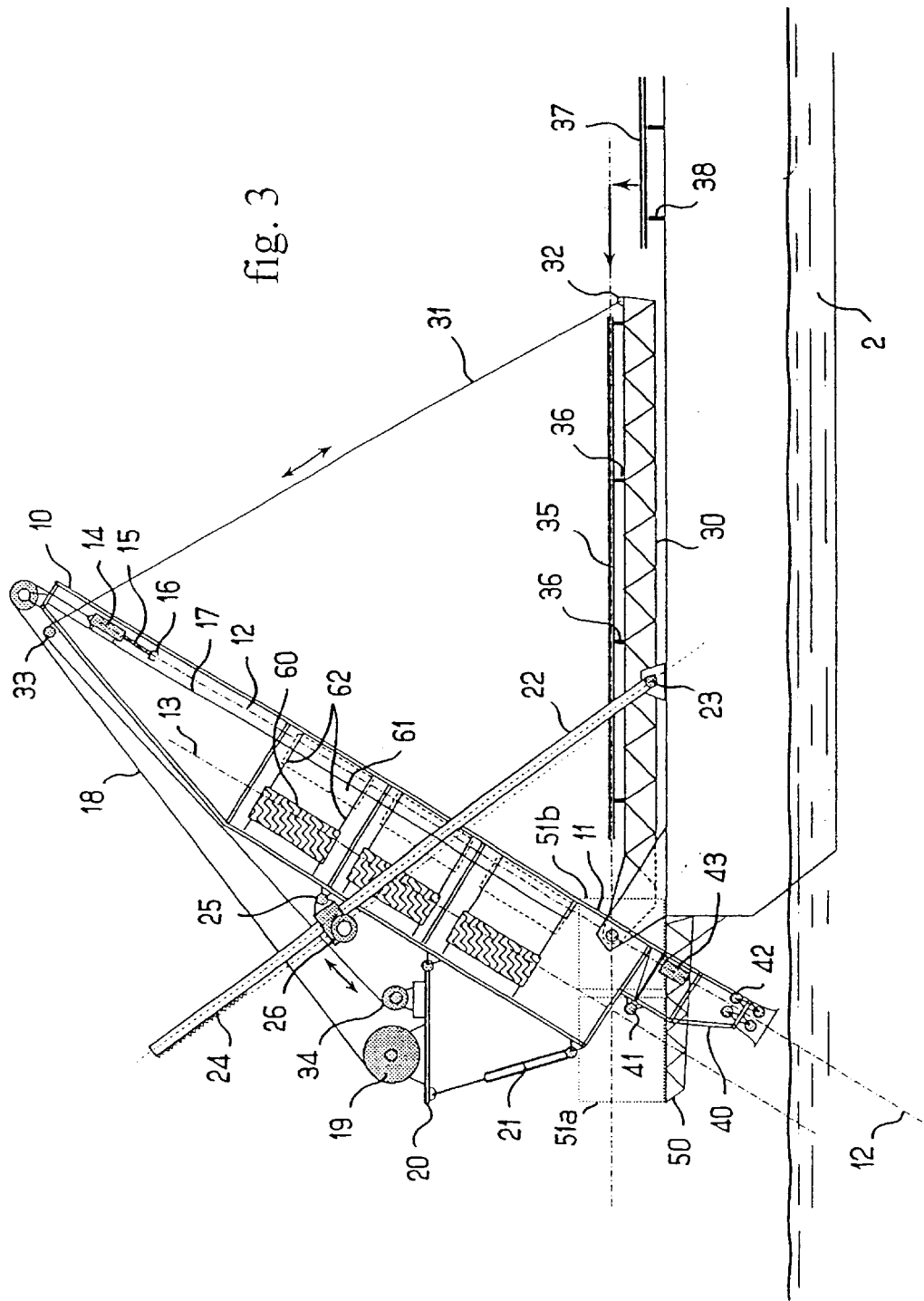

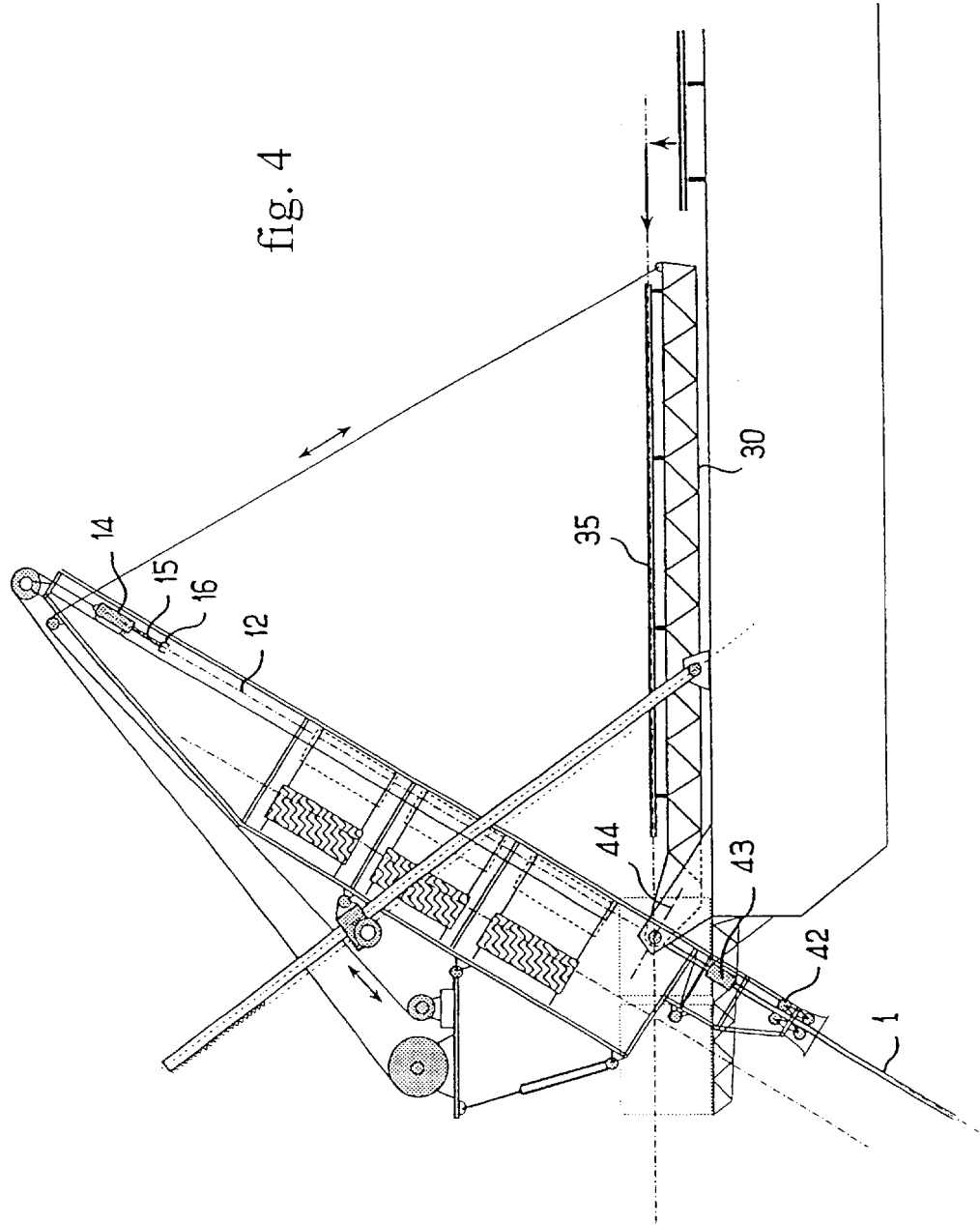

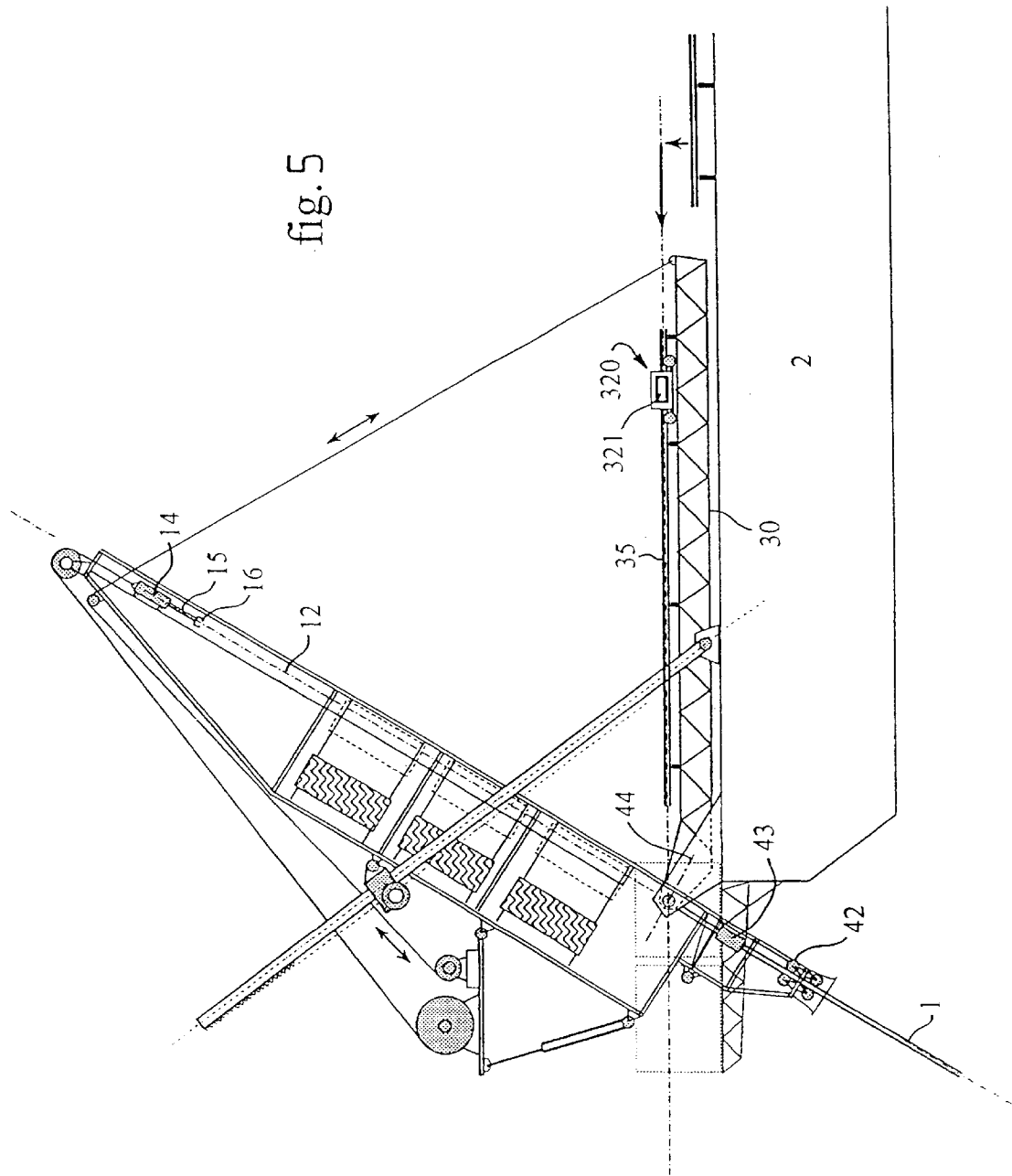

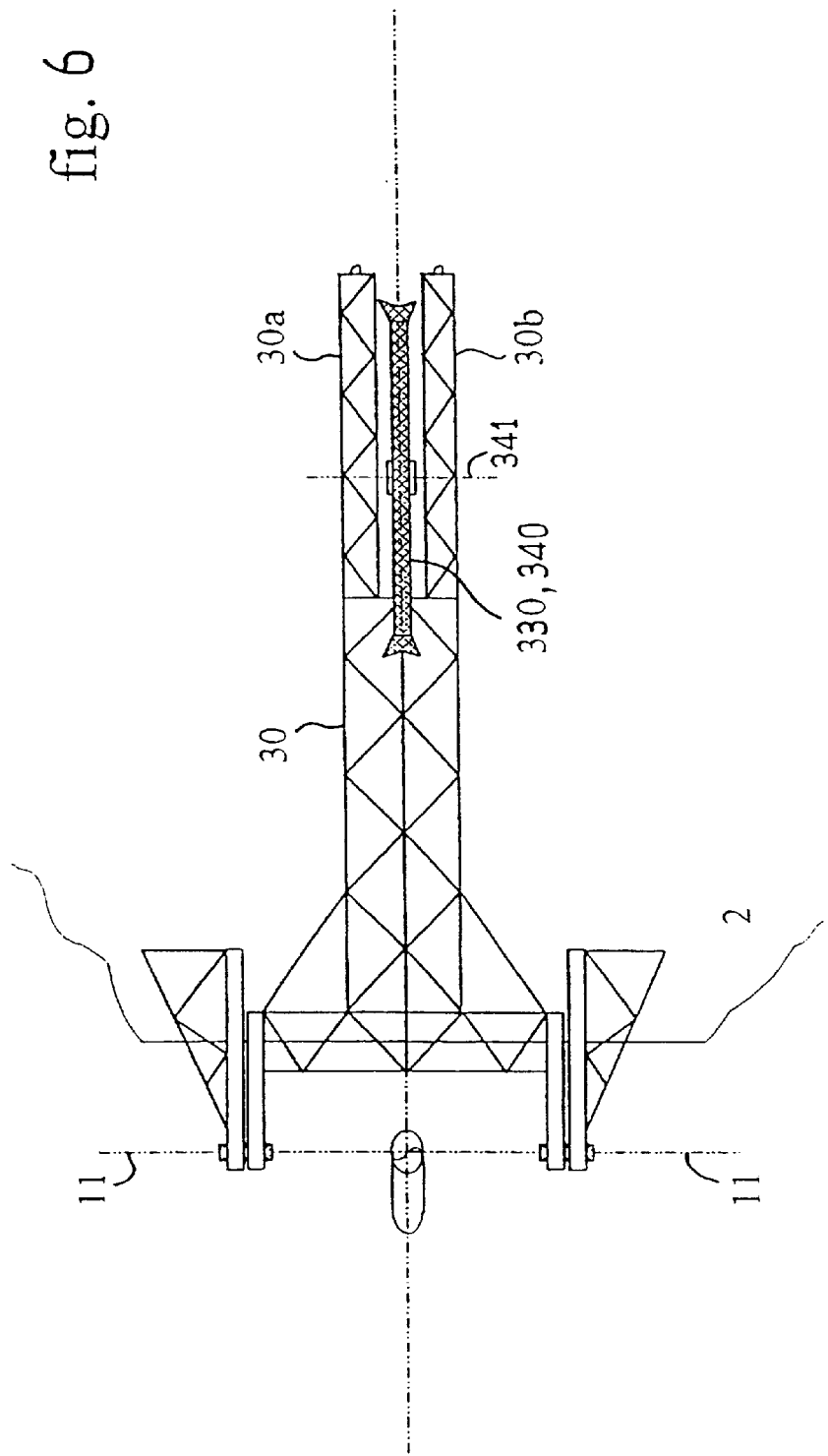

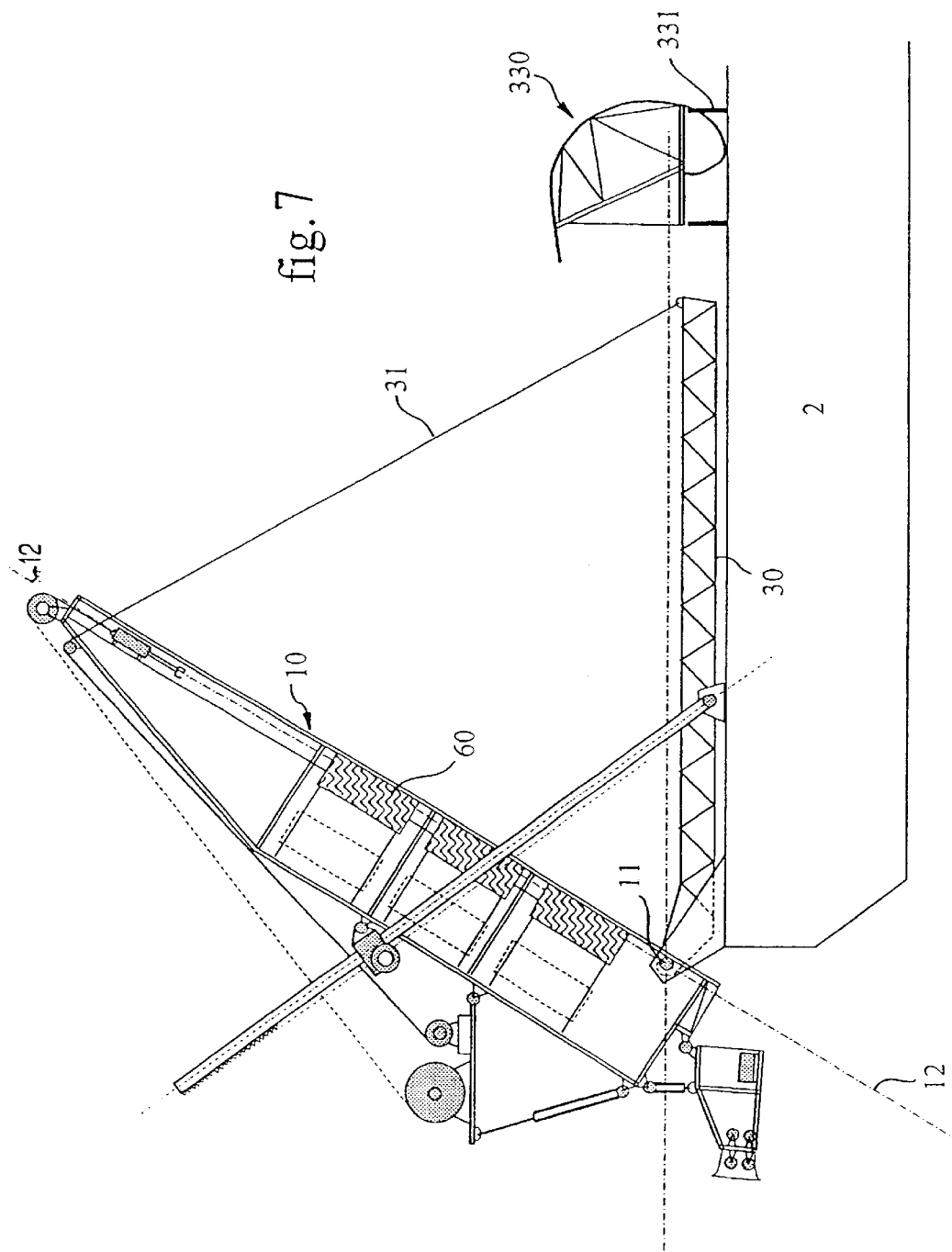

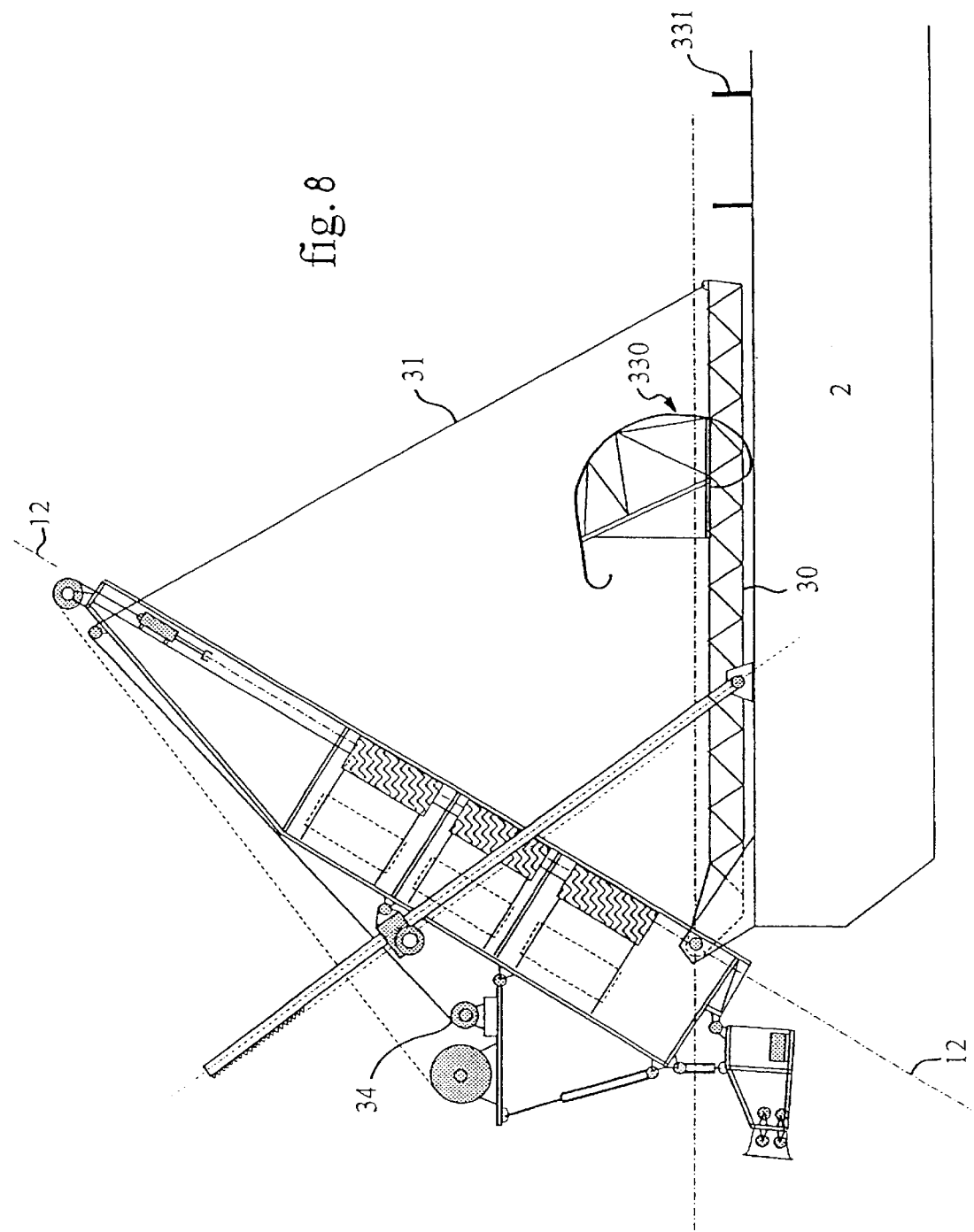

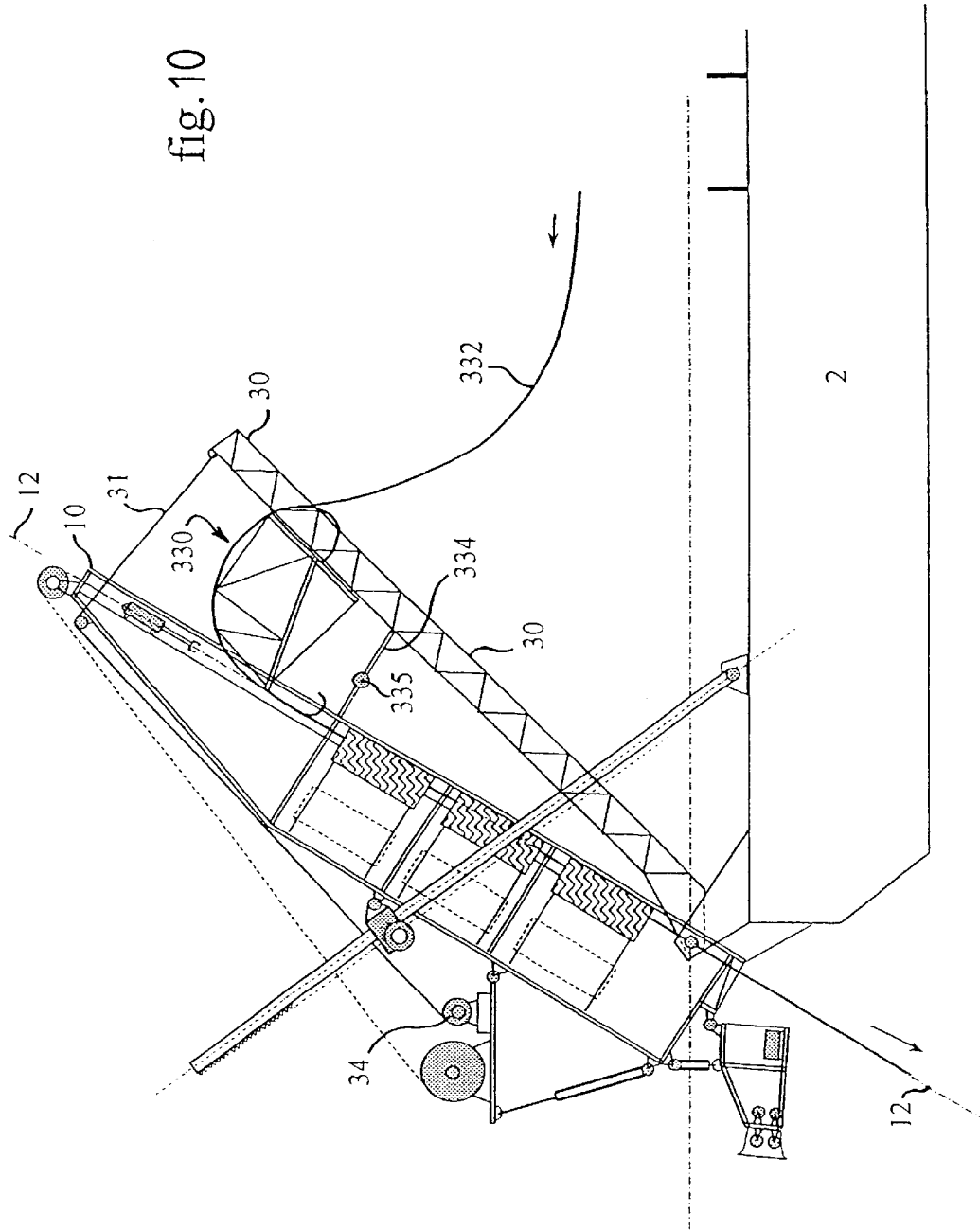

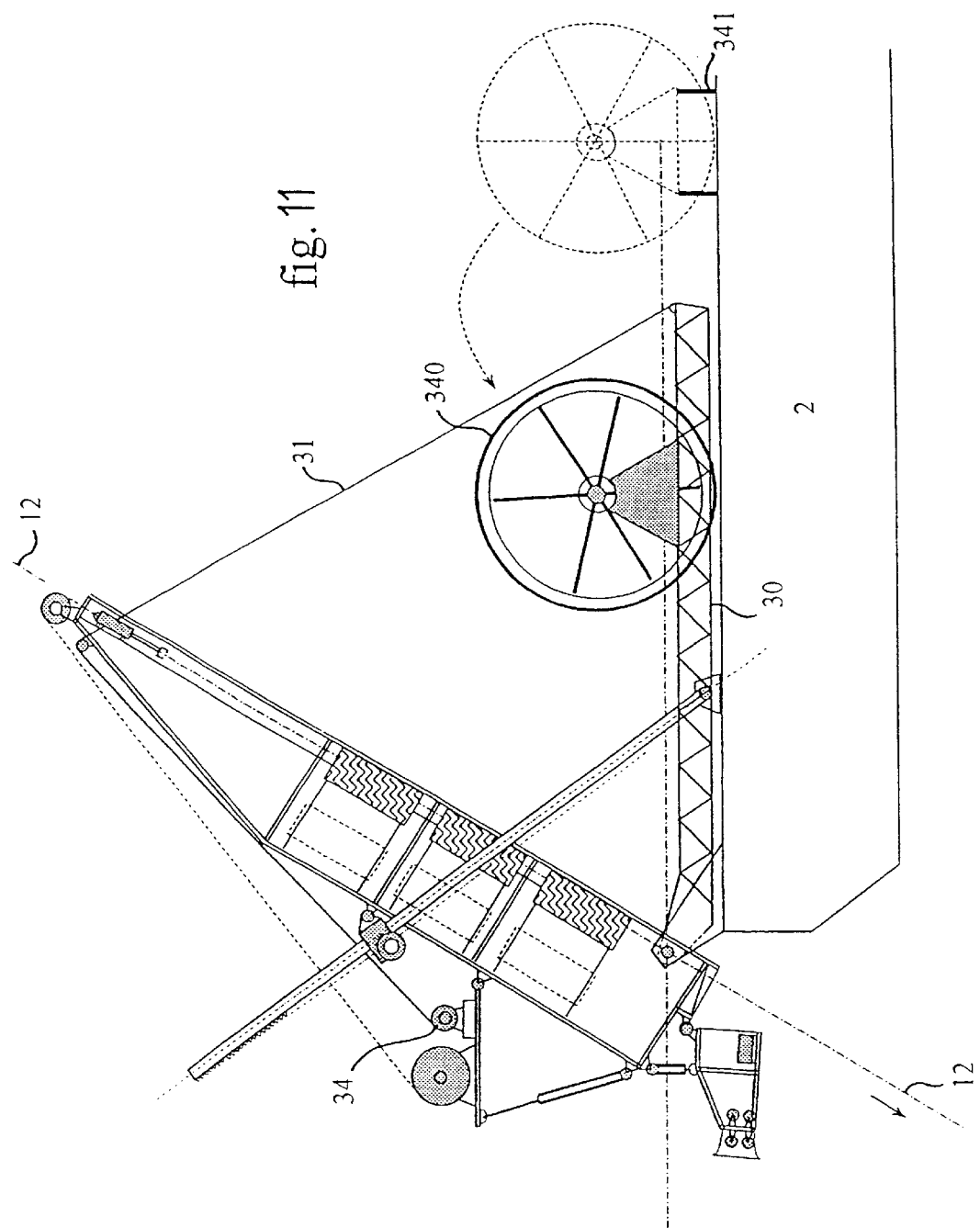

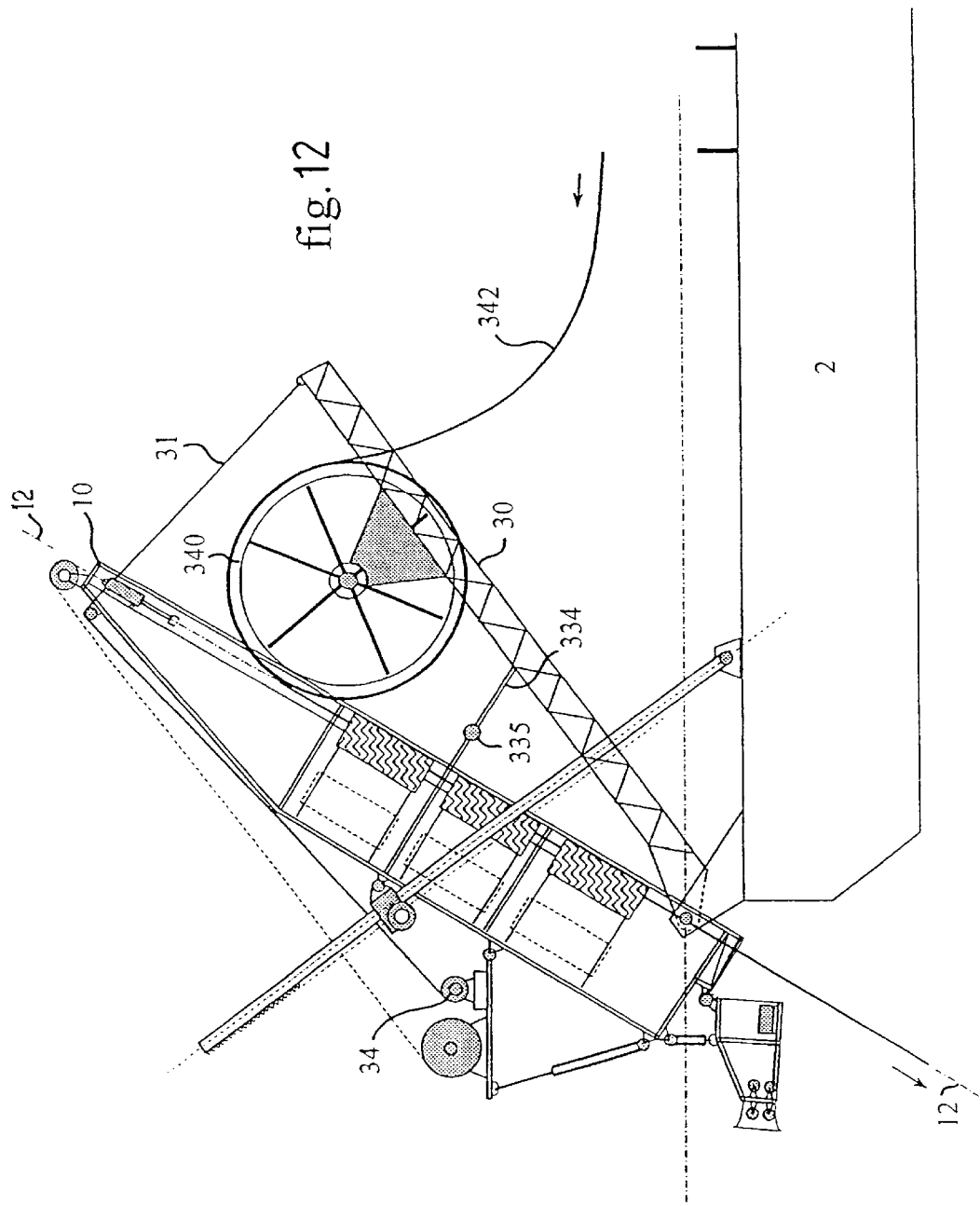

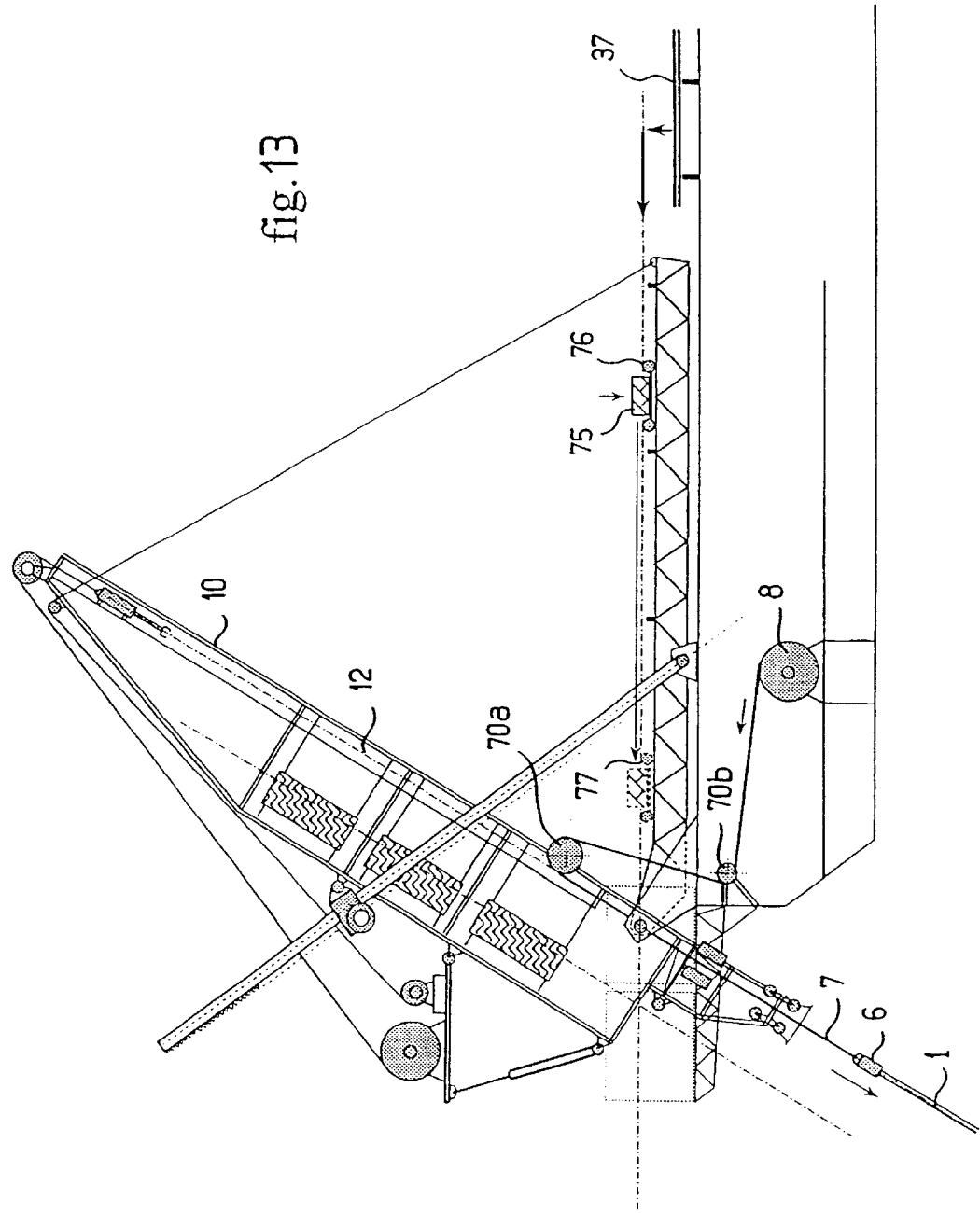

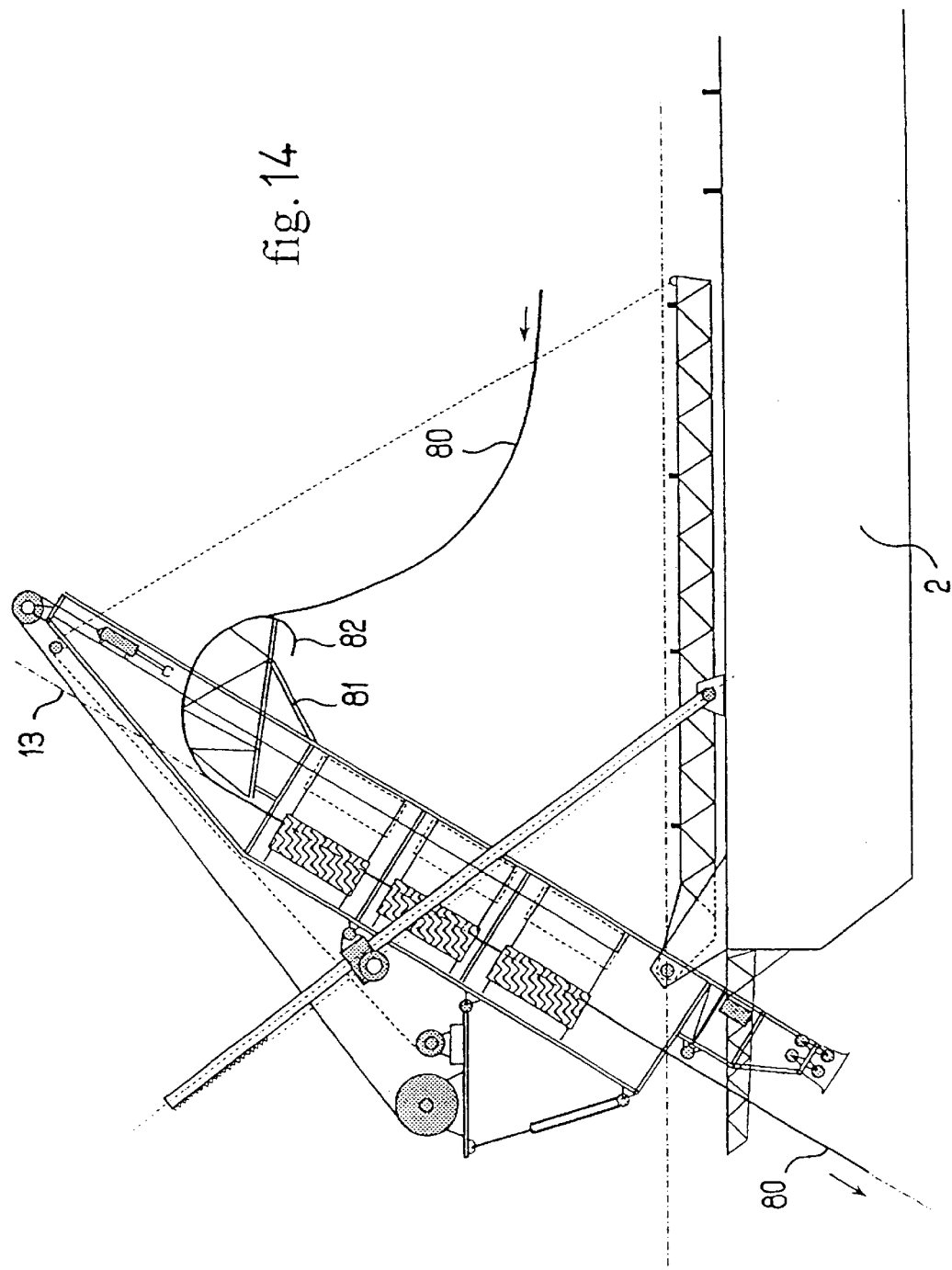

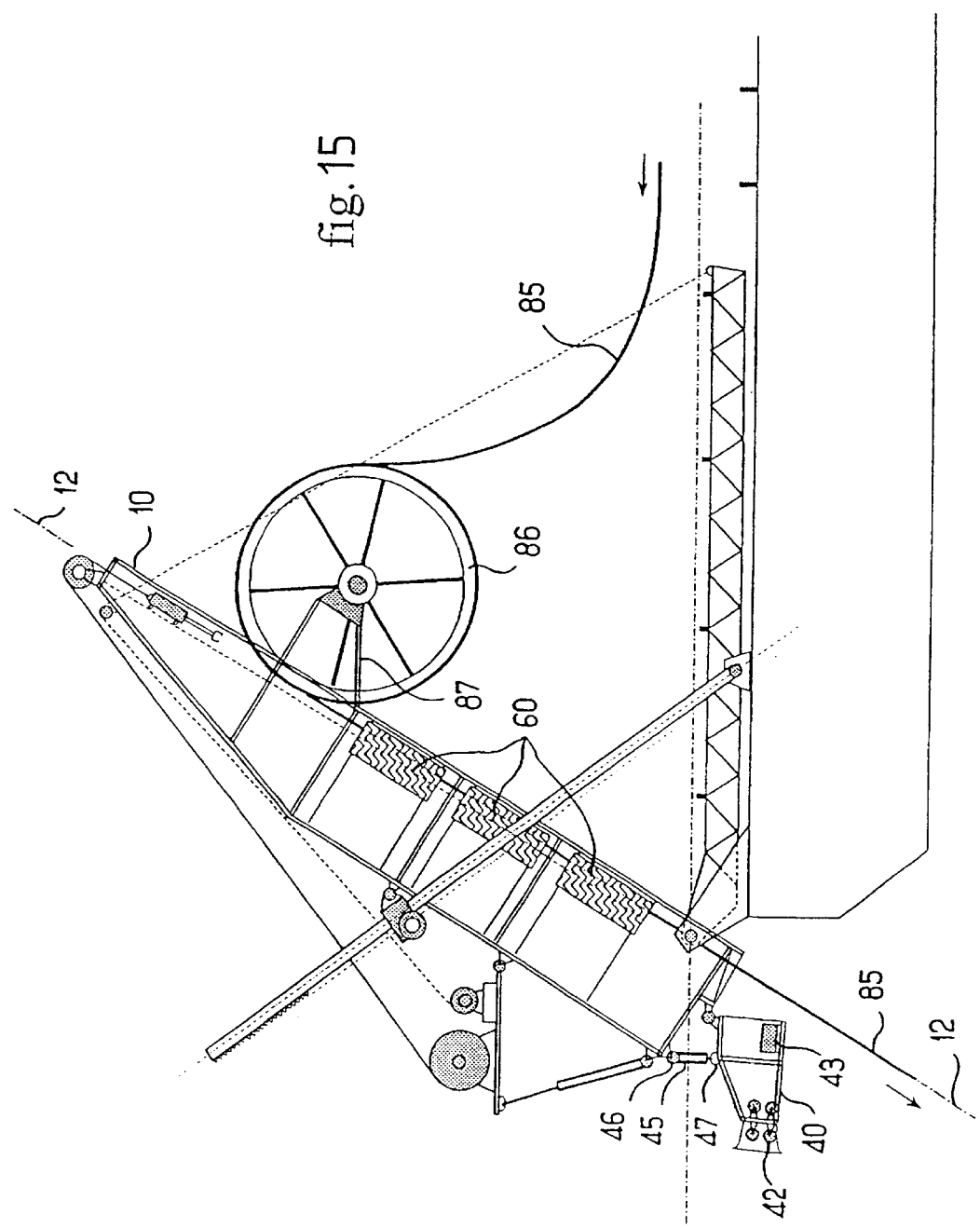

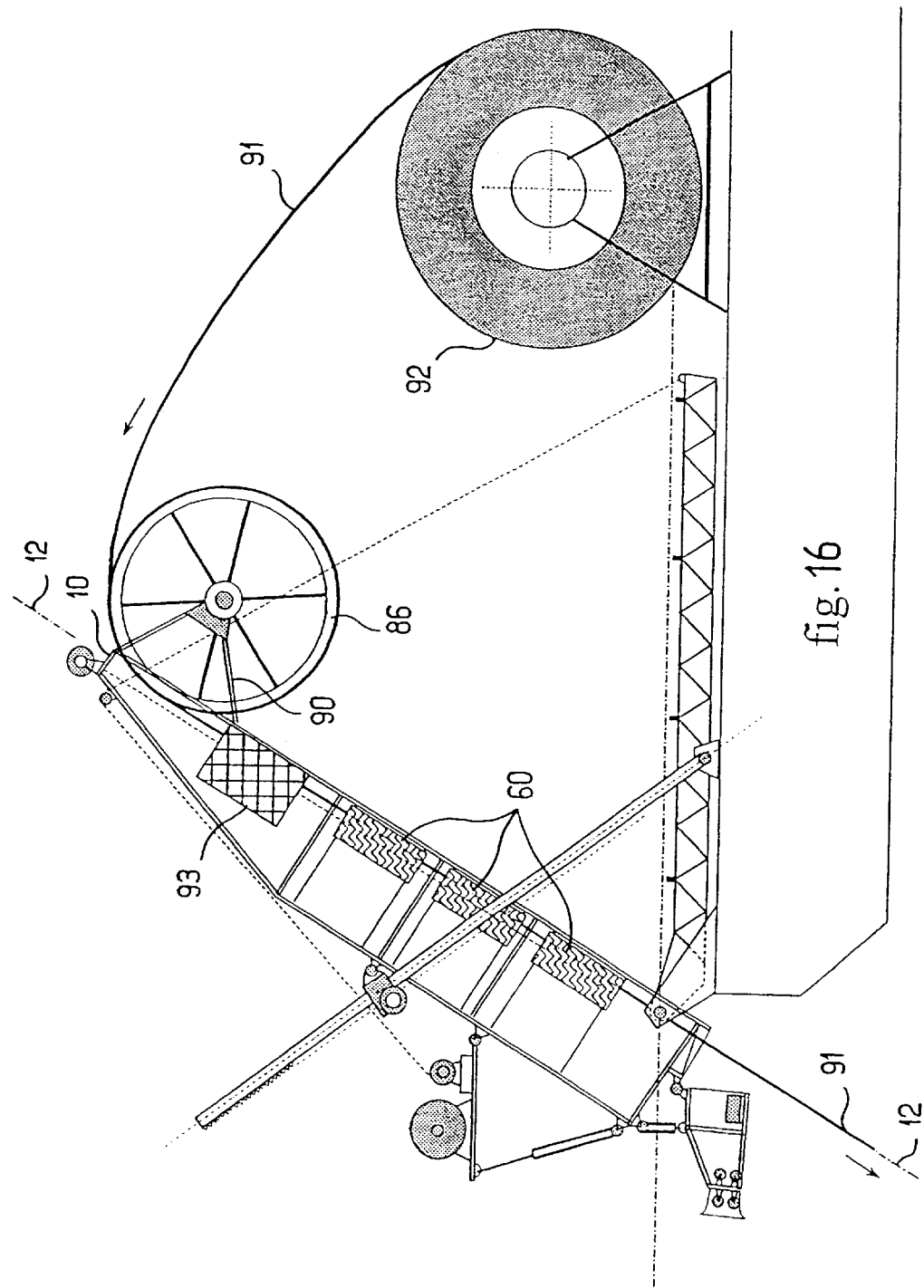

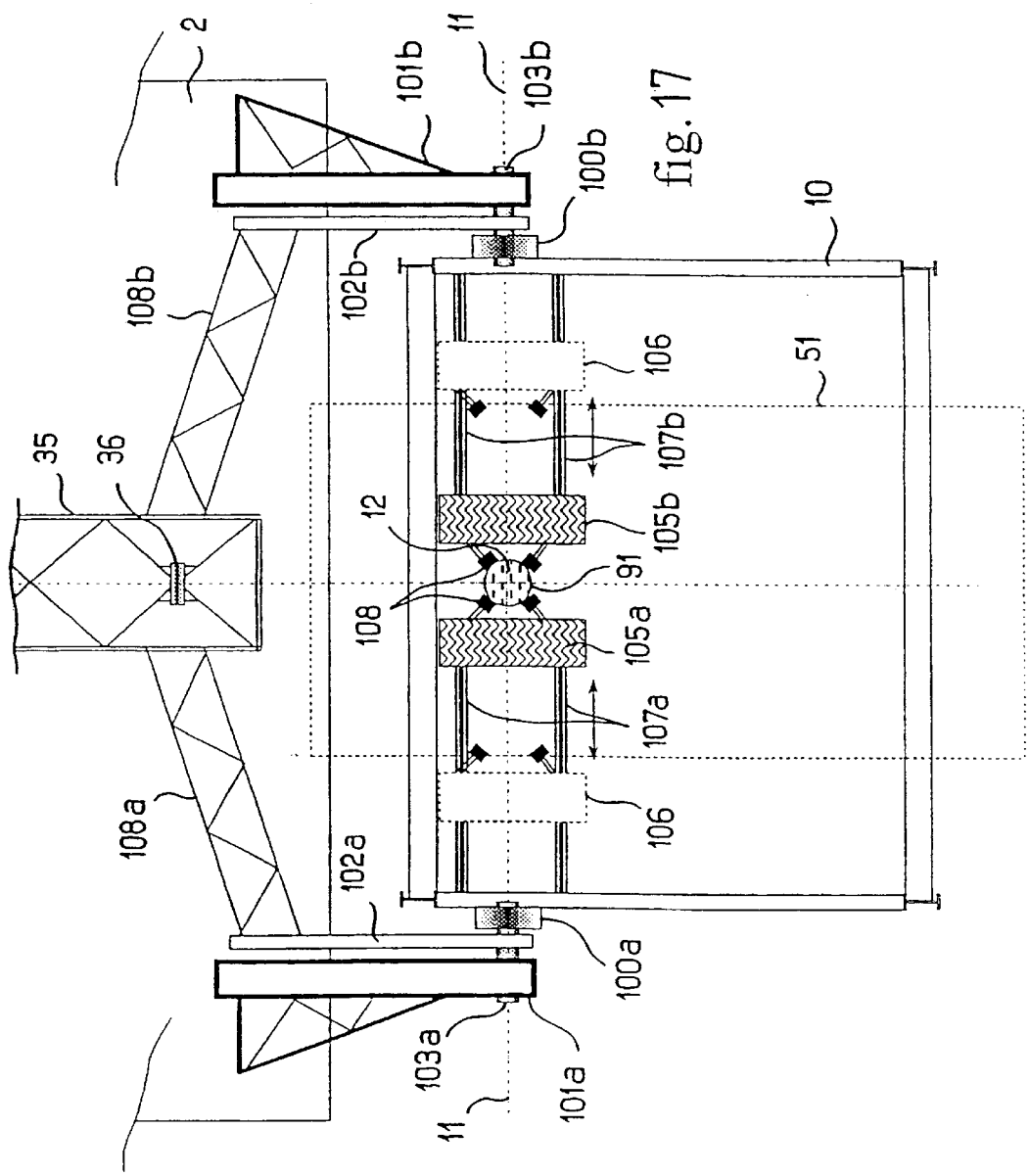

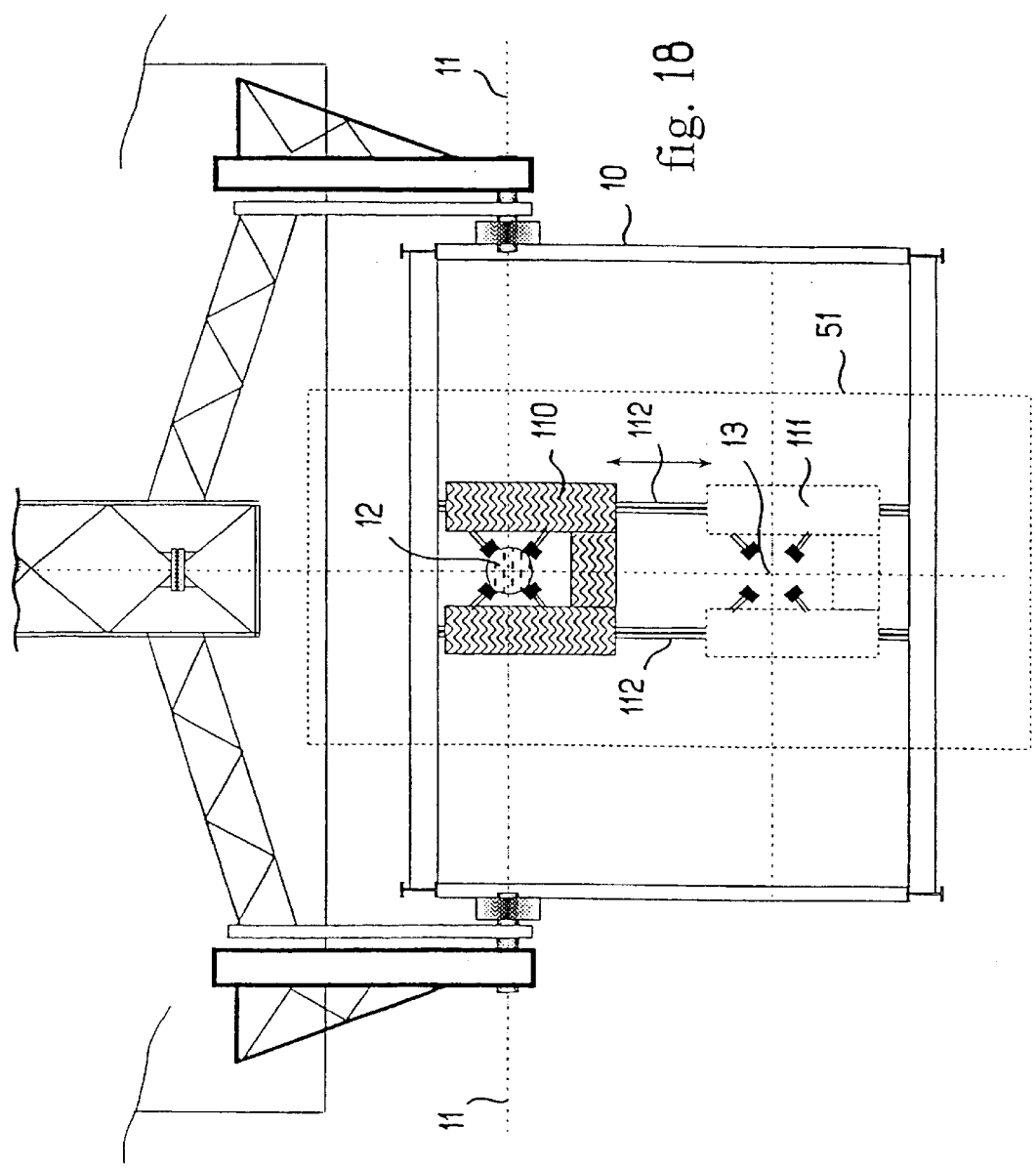

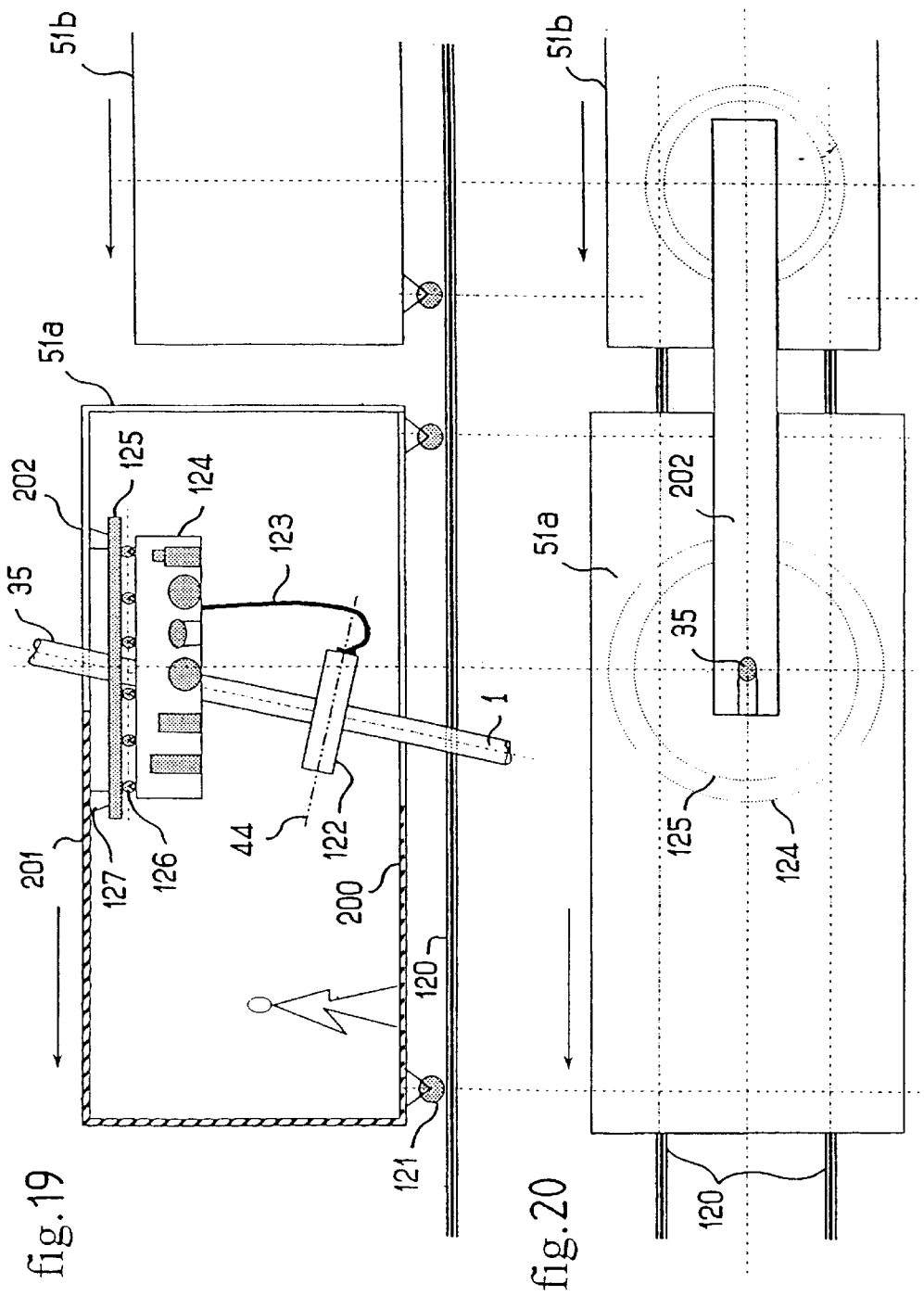

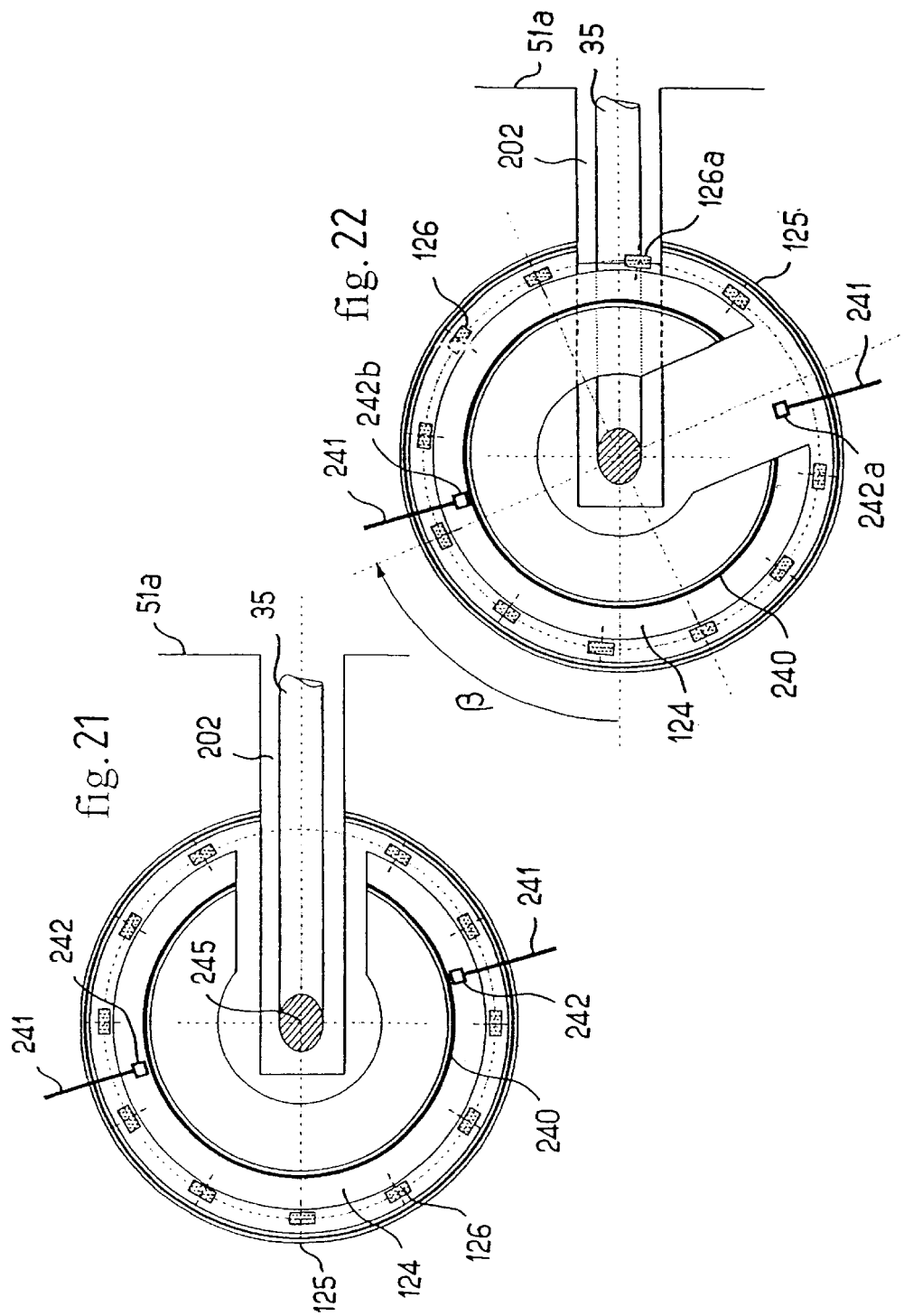

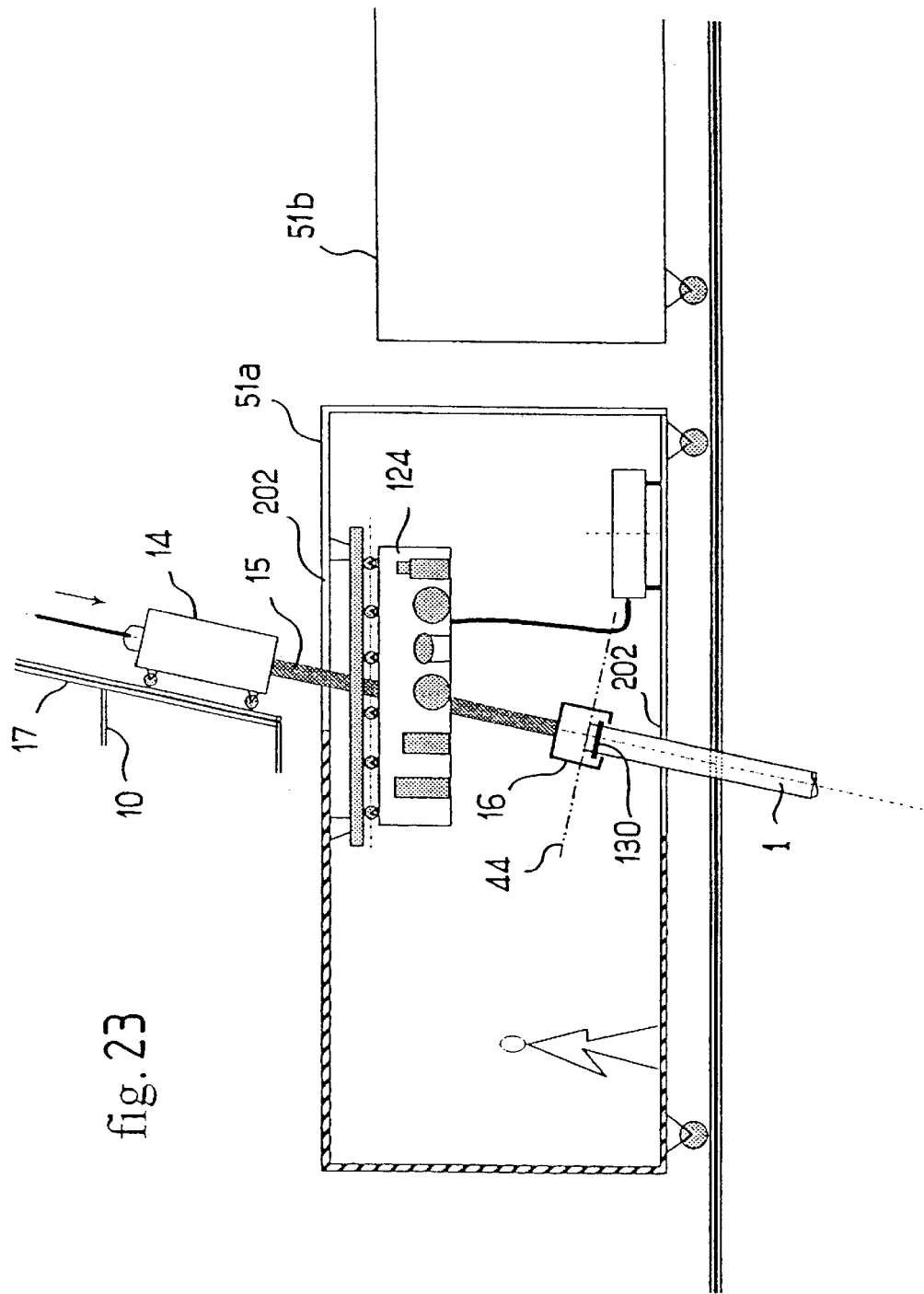

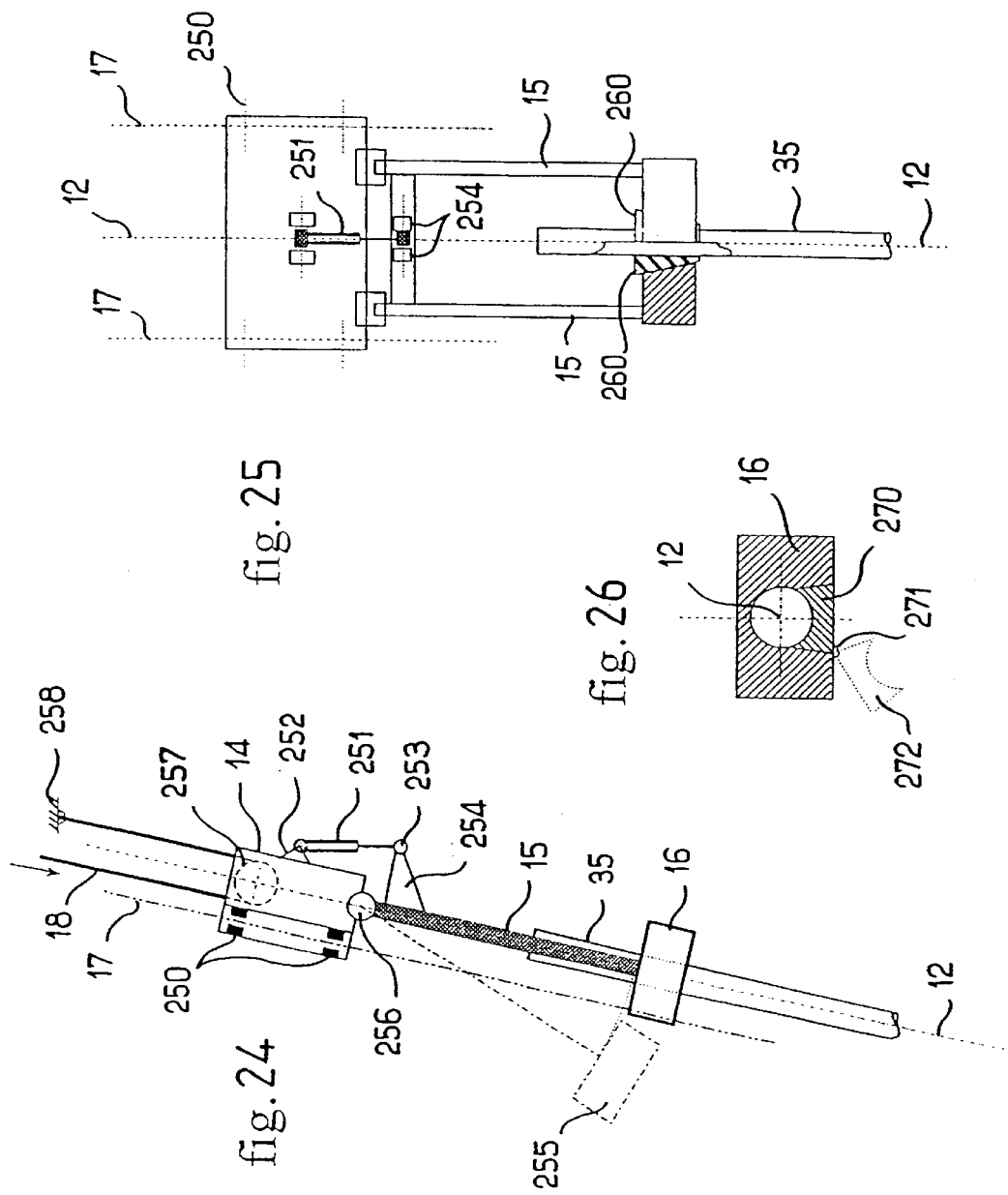

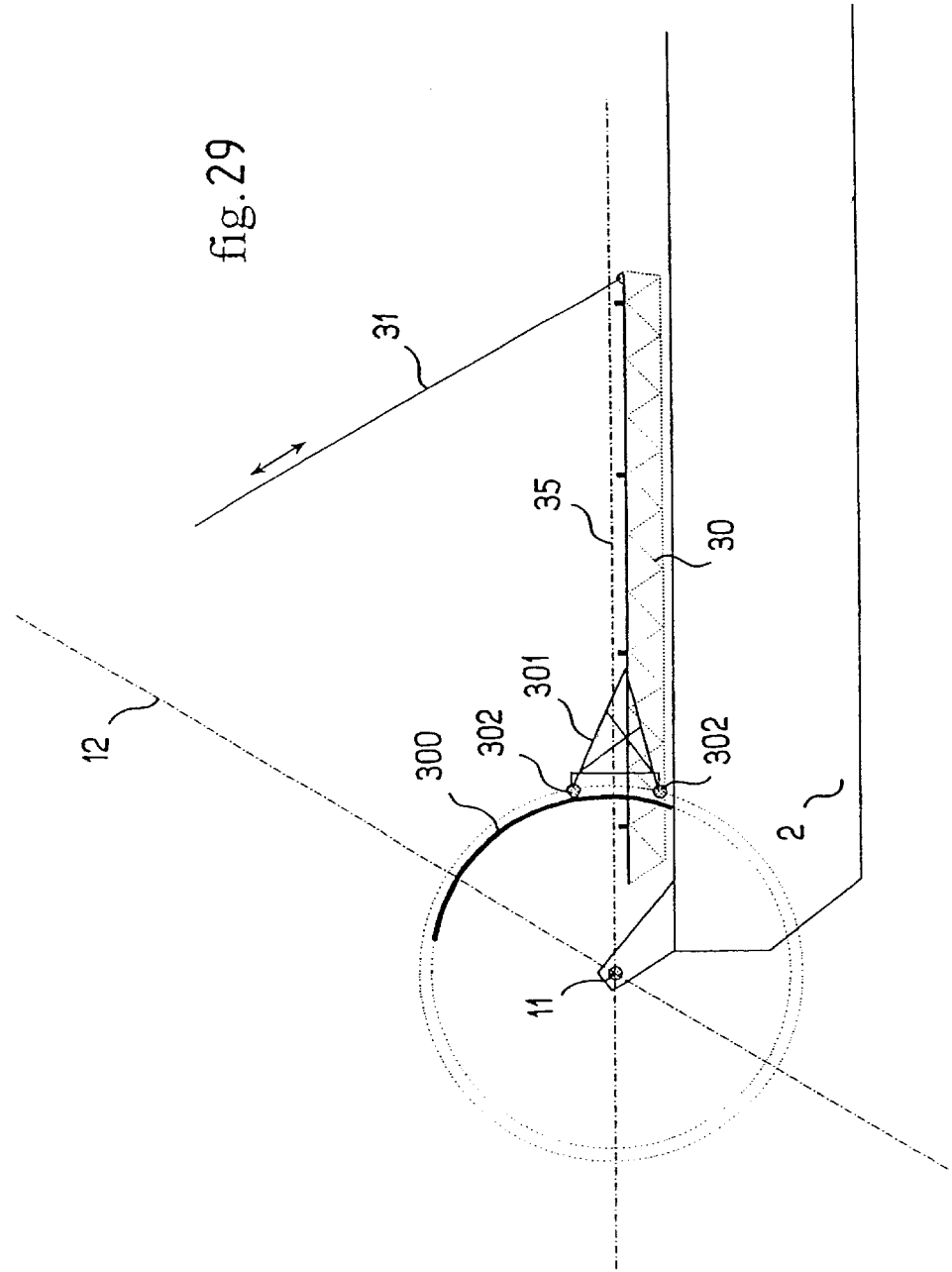

APPARATUS FOR THE CONNECTION AND LAYING OF THE SUCCESSIVE PARTS OF AN OFFSHORE SUPPLY LINE FROM A VESSEL AND APPLICATIONS THEREOF

This is a nationalization of PCT/FR00/01155, filed Apr. 28, 2000, and published in French.

BACKGROUND OF THE INVENTION

1. Field of the Invention

The present invention relates to the connection and laying of the successive parts of an offshore supply line from a vessel performing installation operations, particularly in very great depths of water.

It applies to any supply line intended to carry a fluid, an electrical current, optical signals or information, and in particular to rigid or flexible tubular supply lines, umbilicals and electrical cables, whose behaviour in the vertical plane of the stretch of water is completely similar whatever the transverse rigidity of the supply line, provided that the depth of the said stretch of water exceeds 500 to 600 meters; the curvature adopted by the supply line under such conditions, whatever its nature, being substantially equivalent to the mathematical curve known as a catenary curve, since the effects of the rigidity of the supply line on the resulting curvature are secondary relative to the effects of gravity under these operating conditions.

The word "vessel" means any movable floating unit adapted to allow the laying of a supply line.

2. Description of the Related Art

The connection of the supply line parts requires the already submerged supply line part to be held, the new supply line part to be presented to the end of this part, the assembly tools to be operated and the supply line to be guided for laying in the sea.

Laying apparatuses are known which comprise, on board a vessel, (A) a variable inclination support equipped with means for supporting the weight of the already submerged supply line part and keeping available within an assembly plane the above-water end of this supply line part, means for receiving a new supply line part in accordance with the longitudinal axis of laying of the supply line and bringing it into the said assembly plane, and guide means, (B) means constituting a horizontal pivot of the support on the vessel such that the support can be inclined into the appropriate inclination for the undersea laying of the supply line, (C) means for controlling the pivoting of the support and for maintaining it at the requisite inclination, (D) means for depositing the new supply line part on the support, and (E) a workstation equipped with means for performing the assembly of the two supply line parts and ancillary tasks.

Examples of such apparatuses are described, in particular, in the following patents: U.S. Pat. No. 3,680,322; U.S. Pat. No. 5,421,675; U.S. Pat. No. 5,464,307 and U.S. Pat. No. 3,860,122.

In these embodiments, the workstation is carried by the support and means are required to ensure that this station retains the appropriate attitude, which is generally a substantially horizontal position at the assembly post, whatever the inclination of the support.

This is because the inclination of the support for laying may vary in accordance with the applications, since it depends on various factors including, in particular, the nature of the piping to be laid and the depth of laying.

An apparatus is also known which comprises a supply line support and a workstation which is carried not by the support but by the vessel, the support being fixed and the means for supporting the weight of the supply line part already submerged before assembly takes place being carried by the workstation (EP 0,478,742).

SUMMARY OF THE INVENTION

One of the objects of the invention is to allow the use of a workstation carried by the vessel and not by the support, in the case of a variable inclination support, which confers numerous advantages (simplicity, efficiency, etc.).

This is achieved, in accordance with the present invention, by arranging the pivot of the support so that it intersects the longitudinal axis of laying substantially in the said plane of assembly.

Under these conditions, the situation of the workstation for working is substantially independent of the inclination of the support, and the workstation can be carried by the vessel at a specific location.

In practice, nevertheless, it may be desirable to provide the workstation with a certain freedom of movement on the vessel in order to adapt it as well as possible to the inclination of the support.

The possibility of movement may also be desirable in order to change the nature of the work and, for example, to change from an assembly operation to a coating or monitoring operation.

Finally, the possibility of movement may be desirable in order to retract the station so as not to obstruct the tilting of the support if the support has to be folded down on the deck to make allowance for sea conditions or with a view to a major movement by the vessel.

Assembly by welding is preferred, but the invention is not confined to this form of assembly. In particular, as an alternative embodiment, provision is made for assembly to be undertaken by screwing, sliding fitting or an assembly connector.

Embodiments according to the present invention also possess one or more of the following features:

- means having a curvature for guiding, on the support, a continuous supply line coming from a drum,
- a beam and means for adjusting and maintaining the beam in position when it is in an inclined position, the beam furthermore being equipped with means having a curvature in order to guide a continuous supply line, coming from a drum, towards the support when the beam is in this position,
- the means having a curvature possess a chute,
- the means having a curvature possess a pulley,
- the beam has a U-shaped upper end,
- the means for maintaining the beam in position possess means for locking the beam to the support which comprise a structural link, associated with a bolt,
- the support is a tower of metal girders shaped to allow a displacement of the workstation through or within the support,
- the workstation is displaceable on rails rigidly fixed to the vessel,
- the workstation is displaceable parallel to the longitudinal axis of the vessel,
- the workstation possesses a floor for the movement of personnel and a ceiling and/or a ceiling-type structure which bears necessary means for supplying power to welding heads mounted to be displaceable substantially in the assembly plane, the workstation possesses a ceiling and a floor which have channels for the passage of the end of the submerged supply line part and of the new supply line part, the workstation possesses a rotating turntable equipped with means for supplying power to welding heads, the rotating turntable is carried by a ceiling of the workstation or by a ceiling-type structure, the turntable is capable of translational displacement within the station between an operating position and a retracted position, the workstation comprises a turntable equipped with means for carrying out the said assembly and a turntable equipped with means for carrying out coating operations on the area of assembly, these two turntables being carried by fixed ceiling-type structures or on a ceiling of the station and being displaceable so as to be capable of substitution one for the other, the workstation possesses control means rigidly fixed to an articulated arm which is itself rigidly fixed to a fixed support, the workstation is a cabin whose position relative to the axis of the vessel can be adjusted as a function of the inclination of the tower, the apparatus possesses two workstations respectively equipped with means for assembly and means for carrying out coating of the assembly, these two stations being movable in order to be able to be substituted one for the other in the operating position.

The invention applies, inter alia, to the laying of a supply line consisting of rectilinear sections or strings assembled and laid by stages, each section itself being capable of comprising a plurality of basic lengths of supply line assembled in order to form a string. These basic lengths are generally 12 meters.

It is advantageous, in order to deposit a new string on the support, to use a beam adapted to support the new string and to pivot about a substantially horizontal pivot axis of the beam, preferably the pivot axis of the beam coinciding with the pivot axis of the support, means being provided to control the tilting of the beam between a substantially horizontal starting position, which enables the string to be laid or formed on the beam from a stock, and an inclined transfer position where the string can be transferred to the support, which will previously have been brought into its inclined operating position.

This beam is, for example, articulated on the pivot of the support or is compelled to move in an arc of a circle centred on that pivot.

These two examples of embodiment will be described in due course.

The invention also applies to the laying of a supply line formed from rigid or non-rigid sections rolled up on a distributor and unrolled as required onto the support, with restoration of the section to a rectilinear configuration at the head of the support if necessary.

Another aspect of the invention relates to the use of tensioners adapted to grasp a supply line, upstream of the pivot, on a supply line support mounted pivotably on a vessel in order to be able to adopt any inclination required for the laying of the supply line.

Tensioners adapted to grasp a supply line and to apply to it a retaining force directed upwards along the axis of the supply line are commonly used by the person skilled in the art and are available on the market. Mention may be made, for example, of the tensioners made by Huisman Special Lifting Equipment b.v. and publications U.S. Pat. No. 5,823, 712 and WO 98 50719.

According to the present invention, the tensioners are mounted displaceably on the support between two positions corresponding to a principal laying axis and a secondary laying axis, offset from but parallel to the principal axis.

It is thus possible to use the tensioners to hold and guide a supply line part or a supply line along either of the laying axes.

It is also possible, in conjunction with another apparatus, used to hold a supply line along a first laying axis, to hold and guide, by virtue of the tensioners, an auxiliary supply line, for example a cable, along a parallel laying axis.

These tensioners may therefore advantageously be used in conjunction with a laying apparatus according to the first subject of the invention.

According to another aspect, the invention relates to an apparatus for the connection and laying of the successive parts of an offshore supply line from a vessel, which comprises on board the vessel a variable inclination supply line support equipped with means for supporting the weight of the already submerged supply line part and keeping available within an assembly plane the above-water end of this supply line part, means for receiving a new supply line part in accordance with the longitudinal axis of laying of the supply line and bringing it into the said assembly plane, and guide means, means constituting a horizontal pivot of the support on the vessel such that the support can be inclined into the appropriate position for the undersea laying of the new supply line part, means for controlling the pivoting of the support and for maintaining it at the requisite inclination, means for depositing the new supply line part on the support, a workstation equipped with means for performing the assembly, and a beam adapted to support the new supply line part, this beam being mounted on the vessel in a manner such as to be able to pivot about the said pivot, and being provided with displacement means adapted to retain the new supply line part on the beam and to be displaced along the latter in order to bring the new supply line part into an assembly position in the assembly plane.

Advantageously, the displacement means are equipped with gripping means holding the new supply line portion during the manoeuvre of lifting the beam. These displacement means also make it possible to manoeuvre the new supply line portion accurately during its descent into an assembly position.

According to yet another aspect, the invention relates to an apparatus for the laying of an offshore supply line, unwound from a drum, from a vessel, which comprises on board the vessel a variable inclination supply line support equipped with means for supporting the weight of the already submerged supply line part, means constituting a horizontal pivot of the support on the vessel such that the support can be inclined into the appropriate position for the undersea laying of the supply line, means for controlling the pivoting of the support and for maintaining it at the requisite inclination, and a beam adapted to support a supply line, this beam being mounted on the vessel so as to be able to pivot about a substantially horizontal pivot axis of the beam preferably coinciding with the pivot of the support and comprising means for feeding and guiding a continuous supply line, these feeding means possessing a curvature such that the supply line can be guided on the supply line support without being damaged.

Advantageously, these feed means comprise a chute or a pulley.

Thus, it is made easier, at the shipboard crane, to install the feeding means on the beam rather than on the support. Similarly, it is made easier to install on the feeding means, at the shipboard crane and when laying begins, heavy items such as a heavy connector associated with a new supply line portion when the beam is located on the deck of the vessel.

Advantageously, the upper end of the beam, holding the chute or the pulley, is U-shaped to ensure the centring of the chute or the pulley. The effects of torsion on the beam are thus eliminated.

Advantageously, the beam is locked on the support by a structural link associated with a bolt. This makes it possible to release the tension of the cable intended to move the beam during the operations of laying the supply line.

The various aspects of the invention may be employed independently of one another or in combination.

Other aspects, features and advantages of the present invention will be more clearly apparent from a reading of the description which follows and which is given by way of illustration and not limitation, with reference to the attached drawings, in which the support is a tower.

BRIEF DESCRIPTION OF THE DRAWINGS

In the drawings:

FIG. 1 is a diagrammatic lateral view of the J-laying of a supply line at great depth, FIG. 2 is a lateral view of the approach phase, at the end of the J-laying of a supply line, of the vessel to a floating body, FIG. 3 is a lateral view of the vessel equipped with the laying tower and with its principal accessories for the laying of rigid supply lines, FIG. 4 is a view similar to FIG. 3 showing the supply line in suspension, FIG. 5 is a lateral view of the vessel equipped with the laying tower and its principal accessories for laying rigid supply lines, FIG. 6 is a view from above, relative to FIG. 5, showing the beam supporting a pulley or a chute for feeding flexible supply line, FIGS. 7, 8 and 9 are lateral views of the vessel equipped with the tower, showing in detail a chute for feeding a flexible supply line, respectively in the stored position on the deck of the vessel, then installed on the beam, and finally receiving the said flexible supply line equipped with an end connector, FIG. 10 is a lateral view equivalent to FIGS. 7, 8 and 9, showing in detail an operation of laying a flexible supply line by means of the tower, the beam being in the raised position, FIGS. 11 and 12 are lateral views of the vessel equipped with the tower, showing in detail a pulley for feeding a flexible supply line, respectively installed on the beam and in the laying operation, the beam being in the raised position, FIG. 13 is a lateral view of the vessel equipped with the tower showing a jettison winch and a carriage for handling the accessories for offshore supply lines, FIG. 14 is a lateral view of the vessel equipped with the tower and with a chute for feeding a continuous flexible supply line to tensioners located on the secondary laying axis, FIG. 15 is a lateral view of the vessel equipped with the tower and with a pulley for feeding a continuous electrical cable to tensioners located on the principal laying axis, FIG. 16 is a lateral view of the vessel equipped with the tower and with a pulley for feeding a continuous rigid supply line laid as it is unwound and passing through a straightening system before entering tensioners, FIG. 17 is a section of the tower through a transverse plane, seen from above, combined with a partially plan view of a tensioner in two parts which can be moved apart laterally, FIG. 18 is a view similar to FIG. 17 in which the tensioner is U-shaped, FIG. 19 is a lateral sectional view of a welding cabin associated with a lateral view of the internal equipment, FIG. 20 is the plan view corresponding to FIG. 19, FIG. 21 is a plan view from below of a horseshoe turntable located in the ceiling of a welding cabin, FIG. 22 is a view similar to FIG. 21 in which the turntable has rotated through an angle FIG. 23 is a lateral view of a welding cabin during assembly, FIG. 24 is a lateral view of the hoist block showing in detail the articulation of the arms by means of a hydraulic jack, FIG. 25 is the lateral view corresponding to FIG. 24 and showing in detail the two arms and the gripper with taper keys, FIG. 26 is a section in plan view of the gripper illustrating the front door and its opening, FIG. 29 is a drawing in lateral view showing an embodiment of a virtual axis of rotation such that the beam is restored by describing an arc of a circle centred on the said virtual axis.

DETAILED DESCRIPTION OF THE PREFERRED EMBODIMENTS

Figure 9:
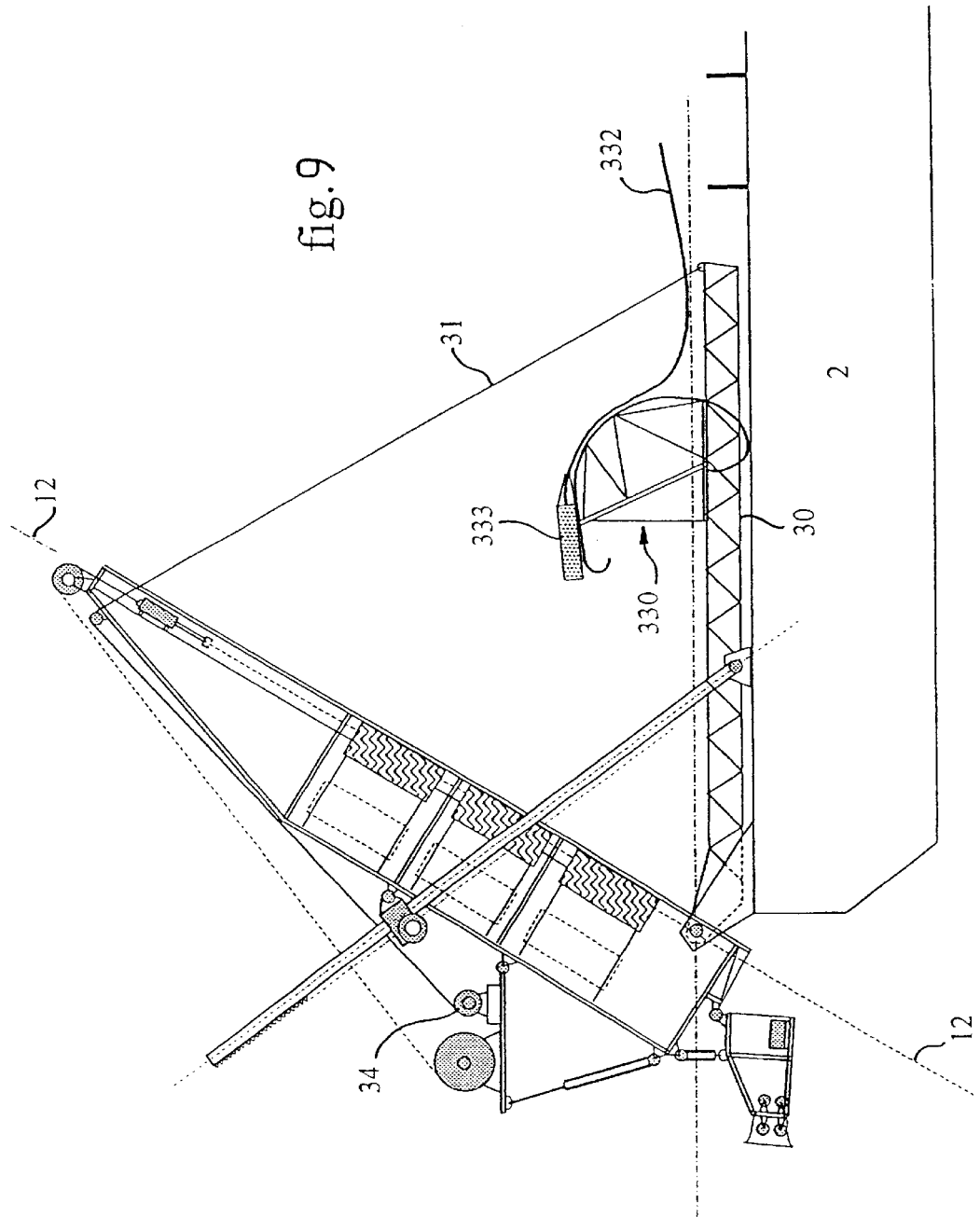

FIG. 1 is a diagrammatic lateral view of the J-laying of a supply line 1 from a lay vessel 2 equipped with a tower 3 inclined relative to the horizontal, so that the axis of the said tower forms a tangent to the catenary curve formed by the supply line in suspension from the said vessel to the seabed 4 on which the supply line rests. The catenary is the mathematical curve adopted by a line of low rigidity when it is subjected to the action of gravity. In very great depths of water, for example in excess of 800 meters, the behaviour of a cable, a hose or a steel supply line of great thickness will be similar, since the rigidity of the line no longer plays a part once the length is substantial: for long lengths, the rigidity of a supply line remains low whatever the rigidity of the cross section of the line.

Thus, with great depths of water, if the depth of water and the inclination at the point of departure from the tower 10 are the same, and in the absence of currents, the general curvature of a line will be identical to the mathematical catenary chain, whatever the nature of the line.

FIG. 2 is a lateral view showing in detail the approach phase of the vessel 2 to a floating barge 5, secured in position by an anchor (not shown). The vessel 2 has performed a rotation through 180 degrees around a vertical axis tangential to its stern. Before beginning this operation, the suspended supply line has been equipped with a jettison head 6, shown in more detail in FIG. 4, and connected to a jettison winch 8, not shown in FIG. 1 but shown in FIG. 4, via a cable 7.

The supply line thus being released from the tower, the vessel can perform a rotation through 180 degrees about its stern and change the angle of inclination of the tower without the risk of damaging the supply line, since the displacements of the vessel are perfectly controlled. To perform this manoeuvre with the necessary precision, use is advantageously made of a vessel with a dynamic positioning system.

Once the vessel 2 has turned, and after correct adjustment of the inclination of the tower 3, the supply line is raised within the tower then, after the supply line has been held suspended, the jettison head and the traction cable are disconnected and the laying of the supply line is continued towards the barge 5.

FIG. 3 is a lateral view of the stern of the vessel 2 equipped with the tower 10, formed by a principal structure of metal beams and a secondary reinforcing structure (not shown).

This tower is articulated, close to its base, about a substantially horizontal pivot 11, parallel and transverse to the deck of the vessel. The said pivot intersects the longitudinal laying axis 12 of the supply lines 1.

A second longitudinal laying axis 13, offset relative to the axis 12, is provided for the laying of flexible lines of great continuous length, such as flexible supply lines, electrical cables or umbilicals, or semi-rigid lines such as unwinding tubular supply lines.

The apparatus comprises a beam 30 substantially parallel to the deck of the vessel 2 and possessing, at its left-hand end, an axis of articulation coinciding with the axis of articulation of the tower on the vessel. Close to its other end is the attachment point 32 of a cable 31 passed around a return pulley 33 situated towards the top of the tower 10, and connected to a winch 34 rigidly fixed to the platform 20. The beam may thus be manoeuvred and brought towards the tower in order to transfer a string 35 resting on a series of supports 36 provided on the beam and held in position by a device (not shown) such as clamps. This string 35 is formed by basic unit lengths assembled together by welding at position 37. The string in preparation 37 is supported by apparatuses 38 making it possible to undertake correct alignment of the various members and to retain them throughout all the assembly operations.

The tower is equipped with means which make it possible to adjust its inclination as a function of the type of supply line to be laid. This adjustment is performed with the aid of a geared motor 26 articulated at 25 on the principal structure of the tower 10, the output shaft of the said geared motor being equipped with a gearing acting on the rack 24 of an arm 22 articulated at 23 on a support rigidly fixed to the deck of the vessel. Thus, by acting on the geared motor, the angle formed by the axis of the tower with the axis of the vessel is changed and the angle of laying of the supply line can be adjusted.

The low part 40 of the tower 10 is articulated in accordance with an axis 41 parallel to the axis 11 and situated below this axis, which makes it possible for this end to be raised to prevent its making contact with the sea during passages at full speed and under full load. This low part 40 is shown here in the working position, and in FIG. 15 in the raised position. The low part 40 is equipped with an apparatus 43 allowing the supply line 1 (not shown) to be held suspended, and a roller guide apparatus 42, adjustable as a function of the diameter of the supply line and capable of being eliminated during periods of jettisoning of line or to allow the passage of heavy and bulky equipment rigidly fixed to the supply line, as described in FIG. 13. This elimination may be undertaken either by means of horizontal articulation or by means of articulation parallel to the laying axis, or again by means allowing translational movements.

In the same manner, the elimination of the low part 40 of the tower 100 can be performed by means of articulation about any axis or of means allowing translational movements.

Three tensioners 60, shown in the working position on the secondary axis 13, may be displaced on the tower, by means which are not shown, in order to arrive at the position 61 corresponding to a working position on the principal axis 12.

A bearing structure 50, rigidly fixed to the vessel 2, supports a welding cabin 51a and a coating cabin 51b, which are movable parallel to the longitudinal axis of the vessel, moving on guide rails (not shown).

These cabins 51, capable of being displaced inside the structure of the tower 10 independently of the angle of inclination of the tower, must not interfere with the latter. For this purpose, the articulation points of the tower 10 and of the beam 30 are located outside and on either side of the principal structure of the said tower, as shown in FIGS. 17 and 18, showing the bearings 100a and 100b of axis 11. In the same FIGS. 17 and 18, the areas 51 of the cabins 51a and 51b are shown in dotted lines.

FIG. 4 is a lateral view, similar to FIG. 3, additionally showing the submerged supply line, whose end is held under tension within the device 43, guided in the area of the rollers, and the upper part of which, corresponding to the assembly zone situated in the plane 44, lies within the coating cabin 51b. Thus, after lifting of the beam 30 carrying the string 35 until the axis of the string coincides with the principal axis 12 of the tower, the upper end of the string 35 is grasped by the gripper 16 and the assembly is lowered again until the lower end of the string comes into contact with the suspended supply line at the level of the plane 44.

The string 35 is then grasped by a system of clamps (not shown) rigidly fixed to the structure of the tower 10, and the apparatus (not shown) holding the string on the beam 30 is then released. The beam is then lowered again to receive a new string for the subsequent cycle.

FIG. 5 is a lateral view of the vessel 2 equipped with the laying tower 10 and its principal accessories for laying rigid supply lines comprising, on the beam 30, a carriage 320 equipped with a guide device, not shown, parallel to the axis of the beam and possessing a system of clamps 321 serving to hold the string when the beam is in the oblique position. The said carriage is fitted with an actuator, such as a hydraulic jack, not shown, fixed to the structure of the beam 30, or with a geared motor, not shown, rigidly fixed to the carriage 320, acting on a rack, not shown, itself rigidly fixed to the structure of the beam and making it possible to perform, in a controlled manner, when the beam 30 is in the raised position, the manoeuvre of lowering the string into the assembly area situated in the plane 44. In following this procedure, use is made of the traction means adapted to the weight of the string alone, and use of the principal winch 19, capable of bearing the weight of the entirety of the supply line 1, which may represent several hundred tonnes, is avoided. The actuator described above, employing relatively low forces, can then be economically sized in order to be capable of much greater translational speeds, for example from three to five times as great as the speed of the principal winch 19, and thus reduce the cycle time for the positioning of a string.

FIG. 6 is a plan view of the beam 30 whose straight part is U-shaped and possesses two arms 30a–30b supporting a pulley 340 for feeding flexible supply line, of axis 341, via bearings, not shown. In the same manner, a chute 330 may be installed in place of the pulley to perform the same function. By adopting this procedure, all loads relative to the weight of the equipment and of the flexible supply line are centred relative to the longitudinal axis of the beam and do not induce torsional forces, as would be the case if the pulley or the chute were to be installed on the side of the said arm. The straight end of the beam, shown U-shaped, may advantageously be closed by means of structural sections so as to increase the rigidity thereof.

FIG. 7 is a lateral view of the vessel 2 equipped with the tower 10, showing a chute 330 for feeding a flexible supply line into a storage position 331 on the deck of the vessel.

FIG. 8 is a view similar to FIG. 7, showing the chute 330 installed on the beam 30. The chute 330 is installed on the longitudinal axis of the beam 30, as shown in FIG. 6, in other words in a manner such as not to induce torsional forces on the supply line.

Advantageously, the feed means 330, 340 possess a radius of curvature adapted so that the supply line is not damaged when it is guided towards or on the support 3. This radius of curvature is, for example, between 0.5 and 10 meters, its value depending on the type of supply lines being laid.

FIG. 9 is a view similar to FIG. 8, showing a flexible supply line 332 equipped with a heavy automatic connector 333, the assembly being in position on the chute 330, held by means (not shown) and ready to be raised towards the tower to initiate the laying of the supply line.

FIG. 10 is a view similar to FIG. 9 showing the beam raised towards the tower 10 and at a tangent to the principal laying axis 12. The flexible supply line, at the exit from the chute 330, passes through the tensioners 60. In the course of laying, the beam is held in position by a device comprising structural elements 334 rigidly fixed, respectively, to the structure 10 of the tower and to the beam 30, the assembly being adjusted then locked by a device 335. By adopting this procedure, it becomes unnecessary to hold the beam with the aid of the cable 31 connected to the winch 34 throughout the laying operation. It is then possible to release the tension in the cable during the said laying operation.

FIG. 11 is a lateral view of the vessel 2 equipped with the tower 10, showing a pulley 340 for feeding a flexible supply line installed on the beam 30. The pulley 340 is installed on the longitudinal axis of the beam 30, as shown in FIG. 6. The pulley 340 may be motorized or otherwise.

The beam 10 is then tilted into the laying position in a manner such that the supply line, placed on the pulley 340, is guided towards the support 10, minimizing the mechanical stresses applied to the supply line.

FIG. 12 is a view similar to FIG. 9, showing, in place of a chute, a pulley 340, motorized or otherwise, for feeding a flexible supply line 342.

FIG. 13 is a lateral view of the vessel equipped with the tower 10, showing details of a jettison or tower release procedure in order to turn the vessel through 180 degrees, followed by a modification of the inclination of the tower 10 with a view, for example, to approaching a barge by going astern towards the latter as shown in detail in FIGS. 1 and 2. For this operation, a winch 8, installed for example in one of the holds of the vessel 2, is connected by a cable 7 passed around return pulleys 70a–70b bringing the said cable back into the principal axis 12 of the tower 10. The end of the cable is connected to a jettison head 6 rigidly fixed to the supply line 1.

FIG. 13 shows a carriage 76 moving on rails (not shown) rigidly fixed to the beam 30. This carriage receives heavy and bulky equipment capable of weighing several tonnes and intended to be installed on the supply line during the laying operations. Thus, the supply lines may be equipped with automatic connectors at the start of laying, in which case, at the beginning of each operation, the connector 75 will be laid on the carriage 76, for example by a derrick, then the assembly will be displaced to the final position 77. The string 37 which has just been prepared will then be transferred towards the beam 30 and its front end will be assembled onto the said connector 75. The string equipped with its connector will then be raised and subsequently transferred to the tower, and laying will then begin.

In the same manner, a second-end connector will be laid on the carriage 76 after the last string has been put in position on the beam 30. By displacing the carriage on its rails, the connector is thus precisely positioned relative to the string to carry out the assembly.

FIG. 14 is a lateral view of the vessel 2 equipped with the tower and with a chute 82 for feeding a flexible supply line 80. The chute possesses a radius of curvature greater than the minimum radius of curvature below which the hose would be damaged and makes it possible to direct the said hose towards the secondary axis 13 of the tower 10. The hose then passes successively into each of the tensioners before entering the water at an angle corresponding to the angle of the laying catenary.

When a hollow supply line or hose is subjected to tension while it is in contact with a curved surface, a breakdown of the forces reveals stresses perpendicular to the surface which will give rise to crushing of the supply line. Thus, when a supply line is under tension, minimum acceptable radius of curvature is a function of the level of tension, and increases therewith.

The device according to the invention thus makes it possible to apply the laying tension in the line only after the said line has been brought into alignment with the laying axis 13, itself tangential to the mathematical curve formed by the catenary. It then transpires that, throughout the movement of the line, until its entry into the tensioners, the line is subjected to low tensions in the course of the multiple curvatures and counter-curvatures generated by the various guides and the chute. The maximum tension in the line is not applied until the line is engaged in the tensioners, in other words when the line is substantially rectilinear.

FIG. 15 shows a lateral view of the vessel 2 equipped with the tower 10 and possessing, in its high part, a support 87 for a pulley 86, the said support being rigidly fixed to the principal structure of the tower 10. A continuous electrical cable, stored on board the vessel on means that are not shown, passes around the pulley and emerges therefrom at a tangent in accordance with the principal axis 12 of the tower 10 to enter into the tensioners 60 whose axis coincides with the principal axis 12. The low part 40 of the tower is shown in the folded-back position, the movement taking place, for example, by virtue of a jack 45 articulated on one side at 46 on the principal structure of the tower 10 and on the other side at 47 on the low part 40. Installation remains entirely possible across the low part restored to the normal position;

in this case, the electrical cable would pass across the guide apparatuses 42 and retention apparatuses 43 without it being necessary to activate them. Similarly, the welding and coating cabins and their supporting system are no longer apparent, although it is possible to leave them in position for this type of operation.

FIG. 16 is a lateral view of the vessel 2 equipped with the tower 10 and possessing, in its high part, a support 90 for a pulley 86, the said support being rigidly fixed to the principal structure of the tower 10. A continuous supply line 91, of thick steel and possessing substantial rigidity, is stored aboard the vessel on a drum 92. After unwinding, the said supply line generally possesses a concave curvature during its travel towards the groove of the pulley 86 to emerge therefrom substantially tangentially, in accordance with the principal axis 12 of the tower 10. It then enters into a straightening apparatus 93, for example having multiple rollers, which, being known to the person skilled in the art of manufacture of tubes and iron wires, will not be described in detail here. At the exit from the straightener 93, the supply line 91 enters into the tensioners 60 whose axis coincides with the principal axis 12. As in FIG. 15, the low part 40 of the tower is shown in the folded-back position and the welding and coating cabins and their supporting system are absent, but could equally well remain in position without the nature of the invention being changed thereby.

FIG. 17 shows a plan view, in transverse section, of the tower 10 in relation to FIG. 16. The section has been taken at the level of the top of the lower tensioner positioned on the principal axis 12 of the tower. The tensioner is formed by two independent parts 105a–105b capable of displacement on guide rails 107a–107b rigidly fixed to the principal structure of the tower 10. The two parts of the tensioner 105a–105b are locked in position on the rails 107a–107b, and the blocks 108 hold the supply line 91 in suspension by simple friction. Such a tensioner, having multiple rows of blocks, being known to the person skilled in the art, especially in the field of the S-laying of offshore supply lines, will not be described in detail here. If the tensioners are not used, the space is released by displacement of the two parts 105a–105b into the respective parking positions 106.

The articulation in accordance with the axis 11 of the tower 10 and of the beam 35 is formed by a bearing 100a–100b rigidly fixed to the principal structure of the tower 10 in which is journalled a pin 103a–103b rigidly fixed to a structure 101a–101b which is itself rigidly fixed to the deck of the vessel 2. The end bearing of the arms 102a–102b, rigidly fixed to the structures 108a–108b, which are themselves rigidly fixed to the beam 35, is journalled on this same pin 103a–103b.

Thus, by these arrangements, the articulation axis 11 does indeed pass through the centre of the supply line to be laid at the level of the assembly plane. The bearings and journals being situated outside the structure of the tower 10 do not interfere with the equipment and, in particular, with the welding or coating cabins whose position is shown by the outline 51.

For the sake of clarity of the description, no item situated below the lower tensioner is shown. In the same manner, only the principal structural items are shown.

FIG. 18 is a plan view, in transverse section, of the tower 10 relating to FIG. 16, similar to FIG. 17, in which the tensioner 110 is formed by a U-shaped structure capable of displacement on guide rails 112, rigidly fixed to the principal structure of the tower 10. During the laying operations, the tensioner 110 is locked in position on the rails 112 by means that are not shown. The tensioner, when it is not being used on the principal axis 12 of the tower 10, may be displaced towards the parking position 111 corresponding, for example, to the secondary axis 13. The tensioner may also be used in this position 111 to undertake the laying of a supply line according to the axis 13, whereas the principal axis 12 is used, for example, for the simultaneous laying of a rigid supply line formed from strings in accordance with the descriptions of FIGS. 3 and 4.

FIG. 19 is a section in lateral view of the welding cabin 51a and a lateral view of the coating cabin 51b, moving on rails 120 by means of castors 121.

Apertures 202 in the ceiling 201 and in the floor 200 of the cabin make it possible to allow the end of the suspended part of supply line 1 to pass, together with the string 35 which has just been loaded with the aid of the beam 30 and lowered as far as the assembly plane 44 by the "hoist block/arm/gripper" assembly as shown in FIGS. 23 to 26.

This assembly comprises a hoist block 14 mounted with longitudinal translational movement on the tower, held by a cable 18 and provided at the front with extension arms 15 connected to a gripper 16 capable of holding the entire weight of the suspended supply line as far as the seabed.

FIG. 24 is a lateral view of the hoist block 14 guided by means of blocks 250 on guide rails 17 (not shown). The hoist block is held by the cable 18 passed around at least one pulley 257 and connected to a fixed point 258 rigidly fixed to the structure of the tower 10. The said cable is linked to the principal winch 19 shown in FIG. 3. Two extension arms 15 are articulated at 256 on the low part of the hoist block and are linked to a gripper 16 capable of holding the entire weight of the suspended supply line as far as the seabed. To this end, the gripper is equipped with a self-clamping apparatus having marking or non-marking wedges 260, as shown in FIG. 25.

This gripper can open so as to be able to be positioned around the supply line. Once in position, a locking system prevents it from opening and the wedges are then activated to take the weight.

Such an assembly is commonly used in drilling equipment in order to manoeuvre the sets of boring rods, and all operations are generally manual. The apparatus according to the invention additionally has means for moving the gripper 16 away from the principal laying axis 12.

To this end, an actuator 251, of the hydraulic jack type, for example, is articulated at 252 on the body of the hoist block 14, on one side, and at 253 on a gusset plate 254 rigidly fixed to the two articulated arms 15.

Thus, by acting on the jack 251, the gripper 16 is moved away from the laying axis 12 and any interference with the string 35 during its transfer to the tower is thus avoided. In the same manner, the aperture of the gripper and its locking system are equipped with actuators (not shown), similar to the jack 251, for the performance of the manoeuvres.

FIG. 25 is a view in elevation of the assembly relating to FIG. 24 and including a sectional view of the left-hand part of the gripper, in a plane intersecting the principal laying axis 12, detailing the clamping wedge.

FIG. 26 is a section, seen in plan view, of the gripper 16 possessing a front part 270 articulated at 271 and locked by means that are not shown.

In order to be able to put the gripper in the retracted position 255, it is necessary to release the bolt (not shown) of the front door 270 then to cause the door to pivot about the articulation 271 so as to bring it to position 272, which thus makes it possible to release the gripper from the string 35. This movement is performed by virtue of an actuator (not shown). During this manoeuvre, some of the self-clamping wedges will remain rigidly fixed to the principal body of the gripper 16, the other remaining rigidly fixed to the front part 270.

The length of the extension arm 15 is such that the arm enables the gripper to reach the axis 11 without the hoist block 14 having to penetrate into the welding cabin 51a. Thus the guide rails 17 of the carriage 14 will stop above the substantially horizontal plane embodied by the top of the ceiling of the cabin or cabins. After alignment of the string 35 with the suspended supply line 1, the assembly is maintained in the coaxial position, internally, by an alignment apparatus (not shown).

A welding ring 122, comprising an opening system, is positioned around the supply line at the level of the assembly plane 44 and is linked to a feed turntable 124 situated in the ceiling via a bundle of lines 123 comprising electrical power cables, control cables and feed cables for consumables, such as welding wire, protective gases or any other product necessary for the assembly of the lines or their protection by coating.

The turntable 124 bearing the generators and the consumables is supported by a circular guide system comprising, for example, castors 126 running on a circular track (not shown) rigidly fixed to a structure 125 which is itself fixed to the ceiling by a large number of attachment points 127. The apparatus according to the invention thus makes it possible, when the turntable 122 rotates about the supply line 1–35, to perform the welding or protection operations, to synchronize the upper turntable in rotation so that the bundle 123 remains substantially vertical throughout the rotational cycle. By adopting this procedure, the necessary length of the lines in the bundle is minimized and operator access to the equipment is made easier, while the risks of damage to the said bundle or to the equipment loaded on the turntables is reduced to a minimum.

Welding turntables, being known to the person skilled in the art in the field of the assembly of steel supply lines, will not be described in detail here.

Similarly, the means necessary to synchronize the two turntables, being known to the person skilled in the art in the field of electrical control systems, will not be described in detail here.

The welding cabin 51a may be displaced to the left by virtue of the U-shaped aperture 202 existing in the ceiling 201 and in the floor 200. In order to be able to escape the supply line, the turntable and its support system are designed in horseshoe shape, as detailed in FIG. 21.

Once the supply line 1–35 has been freed from the welding cabin 51a, the coating cabin 51b is displaced towards the left in order to be positioned around the suspended supply line.

The coating cabin is equipped with specific means installed on turntables similar to those of the welding cabin.

In an alternative embodiment of the invention, two cabins 51a and 51b, although distinct, may be rigidly fixed together so as to create only a single unit which will then be displaced towards the right for the welding operations and towards the left for the coating operations. The partitions common to the two substations can remain in position and thus create a restricted area for each of the operations or be removed and so form only a single cable which, however, has the specific feature of being able to be broken down into two independent working substations.

FIG. 20 is a plan view of the horseshoe turntable situated in the ceiling of the welding cabin.

FIG. 21 shows a view from below, related to FIG. 19, detailing the U-shaped aperture in the roof of the welding cabin 51a.

The cabin is in the extreme right-hand position and the supply line 35 is in the vicinity of the bottom of the U.

The movable part 124 of the turntable is cut away in horseshoe shape and accommodates on its periphery a number of castors, situated on a circular peripheral line, and spaced regularly or otherwise. The said castors run on a track 127 which is itself likewise circular and coaxial with the circular peripheral line of the castors. The track is rigidly fixed to the ceiling of the cabin 51a by a plurality of supports (not shown). The movable part 124 of the turntable possesses, in its right-hand part, a U-shaped aperture which, when the cabin 51a is positioned around the string 35, allows the said string to reach the axis of rotation of the turntable without the structure of the latter interfering with the said string 35. Similarly, the running track 125 possesses an interruption corresponding to the aperture in the roof of the cabin 51a.

The turntable is supplied with electric power by means of a rotating electrical connector comprising a circular track made from conductive metal, for example, copper, and rigidly fixed to the rotating part 124 of the turntable and installed concentrically with its axis of rotation 245. Brushes 242 are in close contact with the circular track and are supported by means (not shown) rigidly fixed to the guide support 125. A conductor 241 feeds the electric current to the brushes. Advantageously, at least two sets of friction blocks are installed for each of the phases of electric current, and preferably in diametrically opposed positions, so that the current is transmitted without interruption during the operating cycle while the turntable is rotating. The apparatus according to the invention will be able to transmit power or control electric currents and will comprise as many "track/brush/conductor" sets as will be necessary. Each of these sets will be insulated from its neighbours and from any surrounding metal structure.

FIG. 22 is the same view as FIG. 21, showing the position of the horseshoe turntable during welding operation after it has rotated through an angle β. During the full rotation, the castors will move on the circular track 125, except in the portion 202, corresponding to the aperture in the roof, where each of the castors will successively be in mid-air as shown with the castor 126a.

In the same manner, during rotation, the brushes 242 will successively be in mid-air, but because there are multiple brushes for a single phase, the transmission of the electric current will not be interrupted. The brush 242a is here shown in mid-air whereas the brush 242b is still in contact.

When the full welding cycle is complete, the aperture of the horseshoe turntable will again be aligned with the aperture in the roof 128 and the cabin can be displaced to the left, without the unit interfering with the string 35.

FIG. 23 is a lateral view of the welding cabin 51a showing the operation of lowering the suspended supply line after the end of the string assembly cycle. The upper end of the supply line 1 is held, at the location of a collar 130 rigidly fixed to the said supply line, by means of the gripper 16 connected to the extension arms 15 rigidly fixed to the hoist block 14 moving on the guide rail 17 of the principal structure of the tower 10. The length of the extension arms is adjusted to enable the hoist to be able to position the upper end of the supply line 1 at the level of the assembly plane 44, whereas the block remains above the cabin 51a, shown as being the higher of the two. By this procedure, the guide rails 17 can stop above the cabin, which makes it possible to minimize the width of the aperture in the roof of the cabin.

In an alternative embodiment (FIGS. 27 and 28), the workstation combines all the equipment necessary for the operations in a single cabin.

The cabin is fixed during the operations but its longitudinal position can advantageously be finely adjusted as a function of the inclination of the tower, by virtue of a guide system comprising rails 120, associated with castors 121 rigidly fixed to the cabin 210. In the working position, the cabin is locked for displacement by virtue of a system of stops 220 and latches 221.

The cabin possesses in the ceiling 212 and at the level of the floor 213 an aperture 211 whose size is a function of the features of the supply lines and of the dimensions of the heavy and bulky accessories which, during the installation operations, will have to pass through the cabin 210. A welding turntable 122–126, already described in detail, is installed in the ceiling of the cabin, and is movable longitudinally on rails 216 (not shown), by means of castors 215.

This horseshoe turntable, having an aperture towards the right, may be released towards the left of the cabin 210 to make way for a similar turntable 222–226 bearing the equipment and consumables necessary for the protection of connectors. The latter turntable possesses an aperture facing towards the left and can thus, by a simple translational movement on the rails 216 by means of the castors 215, be transferred from its parking position to its working position. Within the same cabin, the control means for the welding and, if appropriate, coating operations are installed in fixed positions.

To this end, the control means 232 are rigidly fixed to an articulated arm 231 which is itself rigidly fixed to a support 230 resting, for example, on the floor 213 of the cabin 210. The unit is shown in the folded-back position, the control means resting on a support 233.

Figures 27, 28:
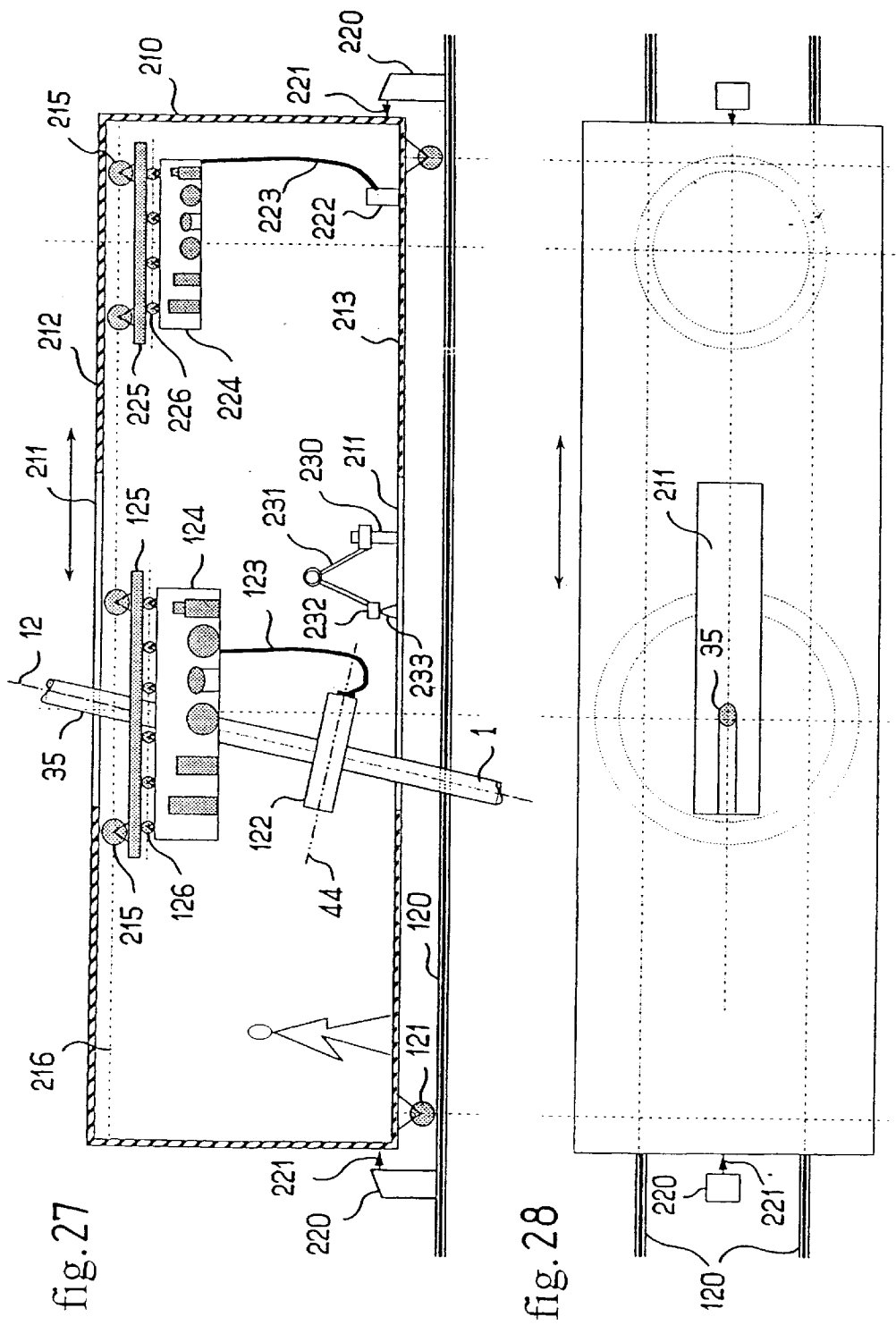
FIG. 27 is a sectional view of a fixed workstation combining the welding, inspection and coating means in a single cabin.
FIG. 28 is the plan view corresponding to FIG. 27.

FIG. 28 is the plan view related to FIG. 27, showing the aperture 211 in the ceiling of the cabin.

FIG. 29 is a diagram of a lateral view showing an embodiment of a virtual axis of rotation 11 making it possible to raise the beam 30 towards the tower 10 (not shown), so that the axis 35 of the string (not shown) intersects the axis 11 of inclination of the tower, and does so whatever the inclination of the said string. To this end, a circular guide structure 300 is rigidly fixed to the vessel 2 and the plane of the circle is perpendicular to the axis 11 and its centre is situated on the said axis 11. Only the circular track has been shown, the principal and secondary structures not being shown. A structure 301 is rigidly fixed to the beam 30 and bears at its end means 302, here comprising castors, which will interact with the circular track in a manner such that, whatever the inclination of the string, the axis 35 intersects the axis 11.

A substantially similar result may be obtained by means of a combination of articulated arms organized as deformable trapezia.

During the assembly cycle of a string, after the beam has been raised and the hoist hooked onto the string, the latter is lowered to come to bear on the upper end of the previously assembled portion of supply line. In this phase, the welding cabin is in position, while the coating cabin is in the folded-back position. At the end of welding, the welding cabin is displaced into its folded-back position and the coating cabin is brought into the working position to perform the operations of protection and any non-destructive tests relating to the weld quality. At the end of the cycle, the carriage takes up the tension of the whole of the assembled supply line, the locking means situated in the lower part of the tower are released, and the assembly is lowered until the hoist, situated at the end of the arm of the carriage, reaches the zone of the assembly plane. In this position, the locking means are reactivated so as to take up the tension of the supply line, the hoist is released and the carriage is raised back to the apex of the tower to await the next string.

During this phase of lowering of the complete supply line, the coating cabin is displaced into its folded-back position and the welding cabin is brought into the working position, ready for the subsequent cycle.

Thus, the invention makes it possible to produce a universal apparatus which allows the laying of rigid or non-rigid supply lines, comprising rectilinear or unwound sections, according to a laying axis which may be chosen as desired, which is consequently suitable for any type of supply line and any depth of laying, and for the simultaneous laying of two supply lines.

The invention is not limited to these embodiments.

In particular, the device according to the invention may be used for laying sections of from a few metres to several tens of metres and also for the laying of supply lines of long continuous lengths from a few tens of metres to several kilometres, wound on drums. These supply lines of long continuous length possess ends capable of being connected by virtue of the device according to the invention. The device according to the invention is therefore intended equally for the laying of rigid supply lines and for that of flexible supply lines, in the form of sections or of long continuous lengths. The features specific to the laying of flexible supply lines, and those specific to the laying of sections or of long continuous lengths, may be present independently of one another on the device according to the invention.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. An apparatus for the connection and laying of successive parts of an offshore supply line from a vessel, which comprises on board the vessel:

(A) a variable inclination supply line support equipped with means for supporting the weight of an already submerged supply line part and keeping available within an assembly plane an above-water end of said supply line part, means for receiving a new supply line part in accordance with a longitudinal axis of laying of the supply line and bringing said new supply line part into said assembly plane, and guide means;

(B) means for constituting a horizontal pivot of said support on the vessel such that the support can be inclined into the appropriate position for undersea laying of the new supply line part;

(C) means for controlling the pivoting of the support and for maintaining the support at the requisite inclination;

(D) means for depositing the new supply line part on the support; and (E) a workstation equipped with means for performing the assembly of successive parts of an offshore supply line, said workstation being carried by the vessel independently of the support, and said pivot intersecting said longitudinal axis of laying substantially in said assembly plane.

2. The apparatus according to claim 1, wherein said apparatus comprises on the support means possessing a curvature for guiding, on the support, a continuous supply line coming from a drum.

3. The apparatus according to claim 1, wherein said apparatus possesses a beam and means for adjusting and maintaining the beam in position, when the beam is in an inclined position, the beam moreover being equipped with means possessing a curvature for guiding a continuous supply line, coming from a drum towards the support when the beam is in said inclined position.

4. The apparatus according to claim 3, wherein the means having a curvature include a chute.

5. The apparatus according to claim 3, wherein the means having a curvature include a pulley.

6. The apparatus according to claim 3, wherein the beam has a U-shaped upper end.

7. The apparatus according to claim 3, wherein the means for maintaining the beam in position include means for locking the beam to the support.

8. The apparatus according to claim 1, wherein the apparatus includes a beam adapted to support a rigid section and mounted on the vessel so as to be able to pivot about a substantially horizontal pivot axis of the beam, means being provided to control tilting of the beam between a substantially horizontal starting position, which enables a section to be laid or formed on the beam from a stock, and an inclined transfer position where the section can be transferred to the support, which is in an inclined operating position.

9. The apparatus according to claim 1, wherein the workstation is displaceable on the vessel.

10. The apparatus according to claim 9, wherein the supply line support is a tower shaped to allow displacement of the workstation within or through the tower.

11. The apparatus according to claim 9, wherein the workstation is displaceable parallel to the longitudinal axis of the vessel.

12. The apparatus according to claim 1, wherein the workstation possesses a floor for movement of personnel and a ceiling or a ceiling-type structure which bears necessary supply means for supplying power to welding heads disposed in a vicinity of the assembly plane.

13. The apparatus according to claim 12, wherein the workstation includes a turntable which bears said supply means.

14. The apparatus according to claim 13, wherein the turntable includes a channel for passage of the new supply line part.

15. The apparatus according to claim 13, wherein the turntable is capable of translational displacement between an operating position and a retracted position.

16. The apparatus according to claim 13, wherein the turntable is supplied with electrical power by means of a rotating electrical connector comprising a circular track made from conductive metal and rigidly fixed to a rotating part of the turntable and two sets of brushes rigidly fixed to a guide support.

17. The apparatus according to claim 1, wherein the workstation comprises first means for performing said assembly and second means for performing ancillary tasks, said first and second means being capable of substitution one for the other.

18. The apparatus according to claim 17, wherein the workstation comprises two cabins that can be substituted one for the other containing, respectively, the first and second means.

19. The apparatus according to claim 17, wherein the first and second means are integrated within a single cabin.

20. The apparatus according to claim 17, wherein each of the first means and the second means includes a turntable.

21. The apparatus according to claim 1, wherein the support includes a low part situated below said pivot and is articulated on a remainder of the support about a pin parallel to said pivot, said low part being equipped with means for retaining a part of the supply line which is already submerged.

22. The apparatus according to claim 1, further comprising a hoist block which is displaceable on said support in accordance with said longitudinal axis of laying and actuated by a winch via a hoist cable and which includes on a front thereof an articulated extension arm equipped with an openable gripper having an aperture which is controlled by an actuator in order to grasp an upper end of the new supply line part, the extension arm having a sufficient length to reach the assembly plane situated within the workstation, said arm being caused to move by means of an actuator.

23. The apparatus according to claim 1, wherein the support is equipped with tensioners adapted to grasp a supply line laterally above said pivot and displaceable from one to the other of two positions corresponding, respectively, to grasping of a supply line according to a principal laying axis and grasping of a supply line according to a secondary laying axis parallel to the principal axis and further than the principal axis from the pivot of the support.

24. The apparatus according to claim 23, wherein the support includes a supply line straightener upstream of the tensioners to restore a recently unwound supply line part to a rectilinear configuration.

25. The apparatus according to claim 1 wherein the laying of a supply line is formed from rigid sections.

26. The apparatus according to claim 1 wherein the laying of a supply line comprising rigid sections is accomplished simultaneously with the laying of another supply line unrolled as required, from a flexible line of continuous length.

27. An apparatus for the connection and laying of successive parts of an offshore supply line from a vessel, which comprises on board the vessel:

(A) a variable inclination supply line support equipped with means for supporting the weight of an already submerged supply line part and keeping available within an assembly plane an above-water end of said supply line part, means for receiving a new supply line part in accordance with a longitudinal axis of laying of the supply line and bringing said new supply line part into said assembly plane, and guide means;

(B) means for constituting a horizontal pivot of the support on the vessel such that the support can be inclined into an appropriate position for undersea laying of the new supply line part;

(C) means for controlling pivoting of the support and for maintaining the support at a requisite inclination;

(D) means for depositing the new supply line part on the support;

(E) a workstation equipped with means for performing the assembly of successive parts of an offshore supply line, said workstation being carried on said vessel independently of said supply line support, and said pivot intersecting said longitudinal axis of laying substantially in said assembly plane; and (D) a beam adapted to support the new supply line part, said beam being mounted on the vessel in a manner such as to be able to pivot about said pivot, and being equipped with displacement means for holding the new supply line part on the beam and adapted to be displaced along said beam, in order to feed the new supply line part into an assembly position in the assembly plane.

28. An apparatus for the laying of an offshore supply line from a vessel, which comprises on board the vessel:
   (A) a variable inclination supply line support equipped with means for supporting a weight of an already submerged supply line part;
   (B) means for constituting a horizontal pivot of the support on the vessel such that the support can be inclined into an appropriate position for undersea laying of the supply line;
   (C) means for controlling the pivoting of the support and for maintaining the support at a requisite inclination; and
   (D) a beam adapted to support a supply line, said beam being mounted on the vessel in a manner such as to be able to pivot about a substantially horizontal pivot axis of the beam, said pivot axis of the beam coinciding with said pivot of the support and including means for feeding and guiding a continuous supply line, said feed means possessing a curvature such that the supply line is guided on the supply line support without being damaged.

29. The apparatus according to claim 28, wherein said feed means comprise a chute.

30. The apparatus according to claim 28, wherein said feed means comprise a pulley.

31. The apparatus according to claim 28, wherein the beam possesses a U-shaped upper end.

32. The apparatus according to claim 28, further comprising means for locking the beam to the support.

33. The apparatus according to claim 28 wherein the laying of a supply line is formed from non-rigid sections rolled up on a distributor and unrolled as required onto the support.

* * * * *